(12) United States Patent
Enami

(10) Patent No.: US 8,896,823 B2
(45) Date of Patent: Nov. 25, 2014

(54) LIGHT DISTRIBUTION CHARACTERISTIC MEASUREMENT APPARATUS AND LIGHT DISTRIBUTION CHARACTERISTIC MEASUREMENT METHOD

(71) Applicant: Otsuka Electronics Co., Ltd., Hirakata-shi, Osaka (JP)

(72) Inventor: Yoshi Enami, Ritto (JP)

(73) Assignee: Otsuka Electronics Co., Ltd., Hirakata-Shi (JP)

( * ) Notice: Subject to any disclaimer, the term of this patent is extended or adjusted under 35 U.S.C. 154(b) by 142 days.

(21) Appl. No.: 13/771,084

(22) Filed: Feb. 20, 2013

(65) Prior Publication Data

US 2013/0265570 A1 Oct. 10, 2013

(30) Foreign Application Priority Data

Apr. 4, 2012 (JP) ................. 2012-085508

(51) Int. Cl.
| | | |
|---|---|---|
| *G01J 1/00* | (2006.01) | |
| *G01J 1/42* | (2006.01) | |
| *G01J 1/04* | (2006.01) | |
| *G01J 1/02* | (2006.01) | |
| *G01J 3/50* | (2006.01) | |
| *G01J 3/51* | (2006.01) | |

(52) U.S. Cl.
CPC ............ *G01J 1/4257* (2013.01); *G01J 1/0403* (2013.01); *G01J 1/0242* (2013.01); *G01J 3/505* (2013.01); *G01J 3/51* (2013.01); *G01J 1/4228* (2013.01); *G01J 1/0228* (2013.01); *G01J 2001/4247* (2013.01); *G01J 1/0488* (2013.01)
USPC .......................................... 356/213; 356/218

(58) Field of Classification Search
CPC ............ G01J 2001/4247; G01J 1/0242; G01J 1/4257; G01J 1/0228; G01J 1/04; G01J 1/0407; G01J 2001/4252; G01J 3/0254; G01J 3/505; G01J 1/42; G01J 1/4228; G01J 2001/0481; G01J 3/0216; G01J 1/02
See application file for complete search history.

(56) References Cited

U.S. PATENT DOCUMENTS 8,422,018 B2 * 4/2013 Osawa et al. ................. 356/445
2014/0002130 A1 * 1/2014 Ohkubo et al. .......... 250/227.11

FOREIGN PATENT DOCUMENTS

JP 2008-070290 3/2008

\* cited by examiner

*Primary Examiner* — Michael P Stafira
(74) *Attorney, Agent, or Firm* — Mori & Ward, LLP

(57) ABSTRACT

A light distribution characteristic measurement apparatus for measuring the light distribution characteristic of a light source is provided. The apparatus includes a plurality of detectors arranged so that they have a predetermined relative relationship with each other. One detector has a detection range at least partially overlapping a detection range of another detector adjacent to the former detector. The apparatus further includes a drive unit that drives a plurality of detectors as one unit to update a positional relationship of the plurality of detectors relative to the light source, and a calculation unit that calculates the light distribution characteristic of the light source by performing a process depending on at least one of a relative relationship between a plurality of detectors and overlapping of respective detection ranges thereof, based on respective results of detection that have been acquired by the plurality of detectors at the same timing.

14 Claims, 34 Drawing Sheets

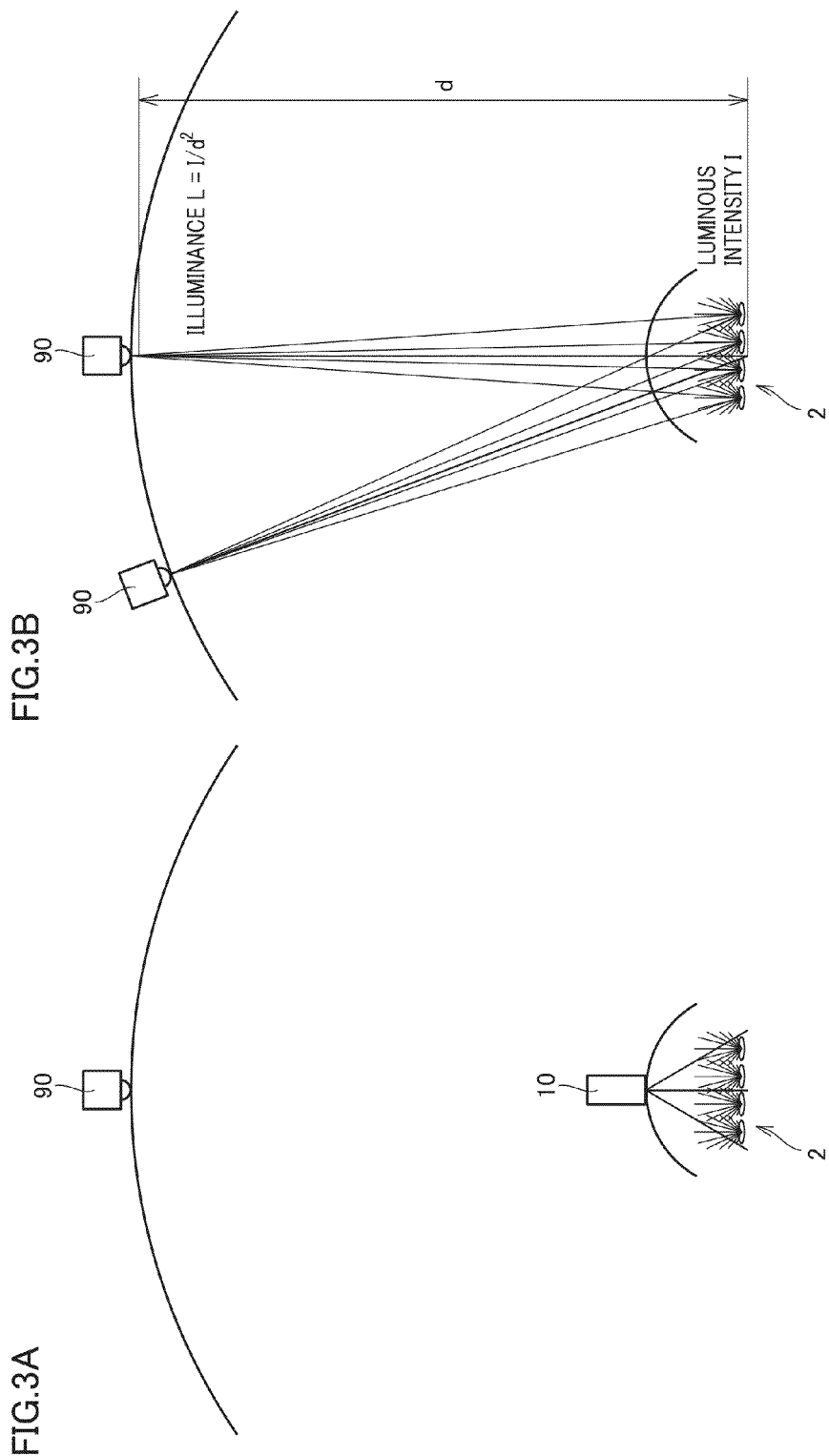

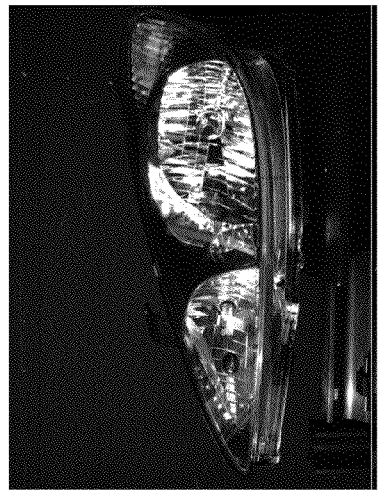
FIG.6A
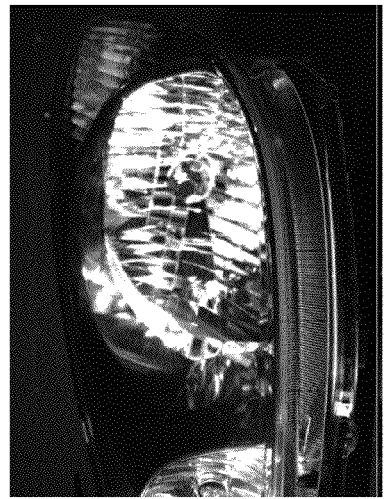
FIG.6B
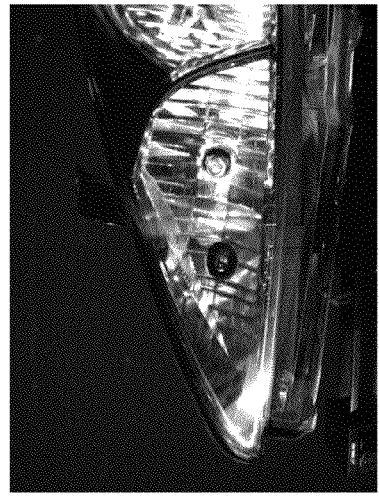

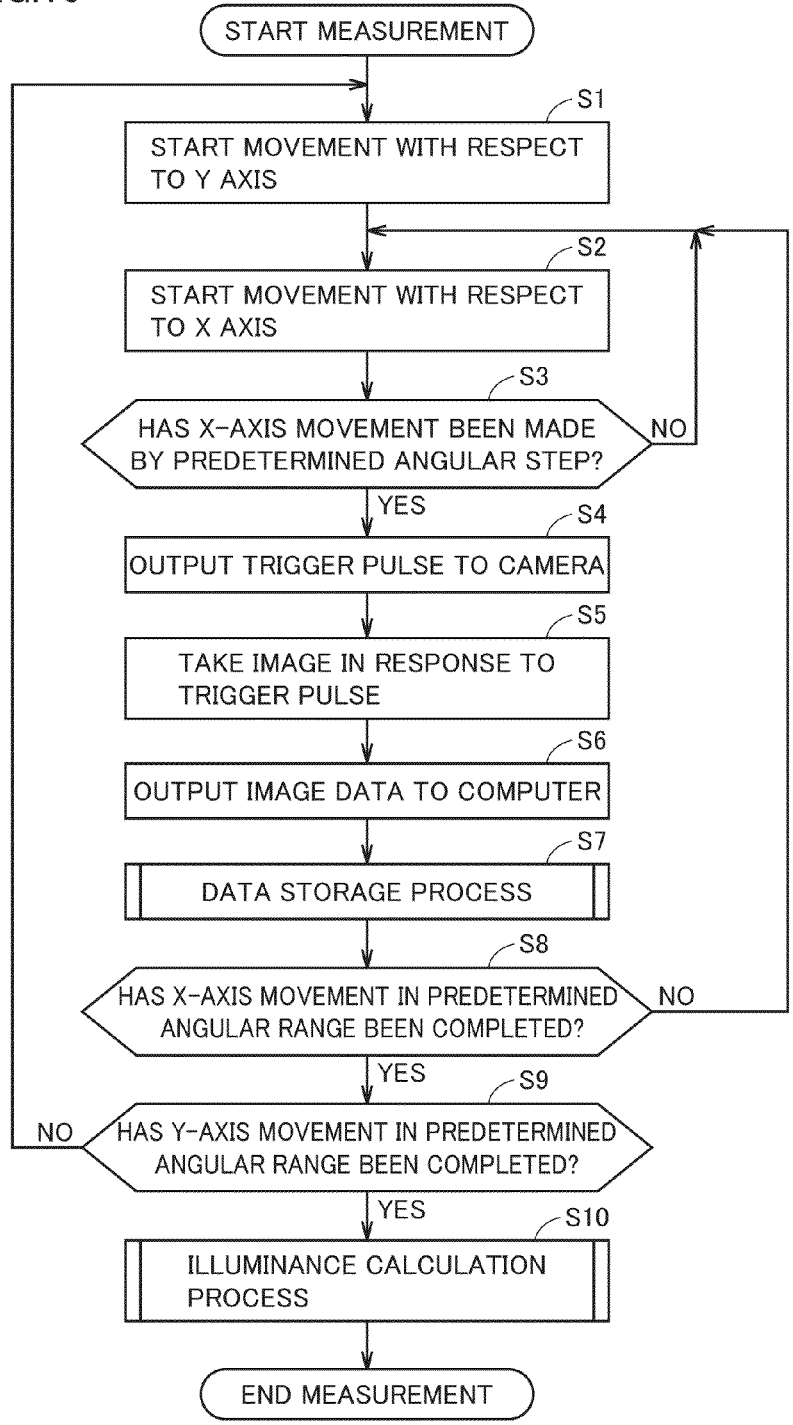

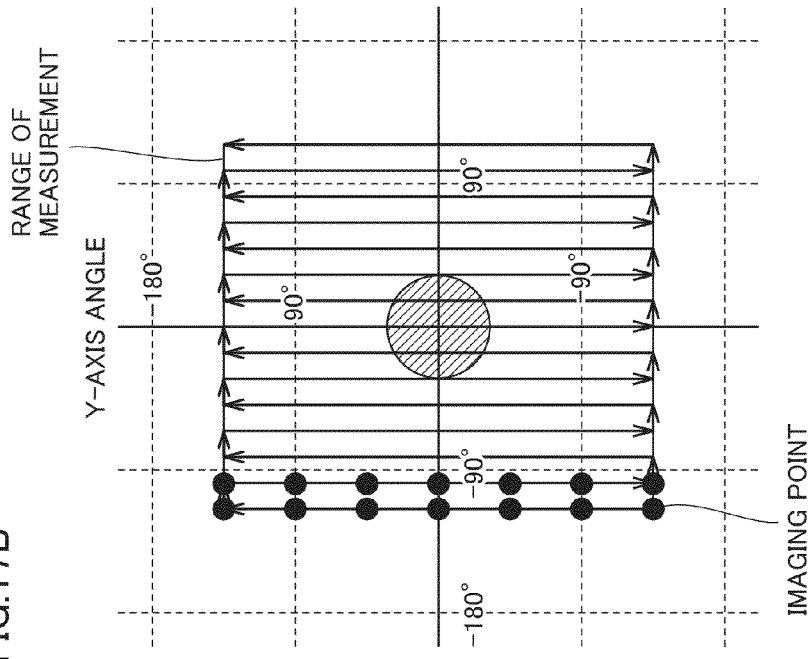
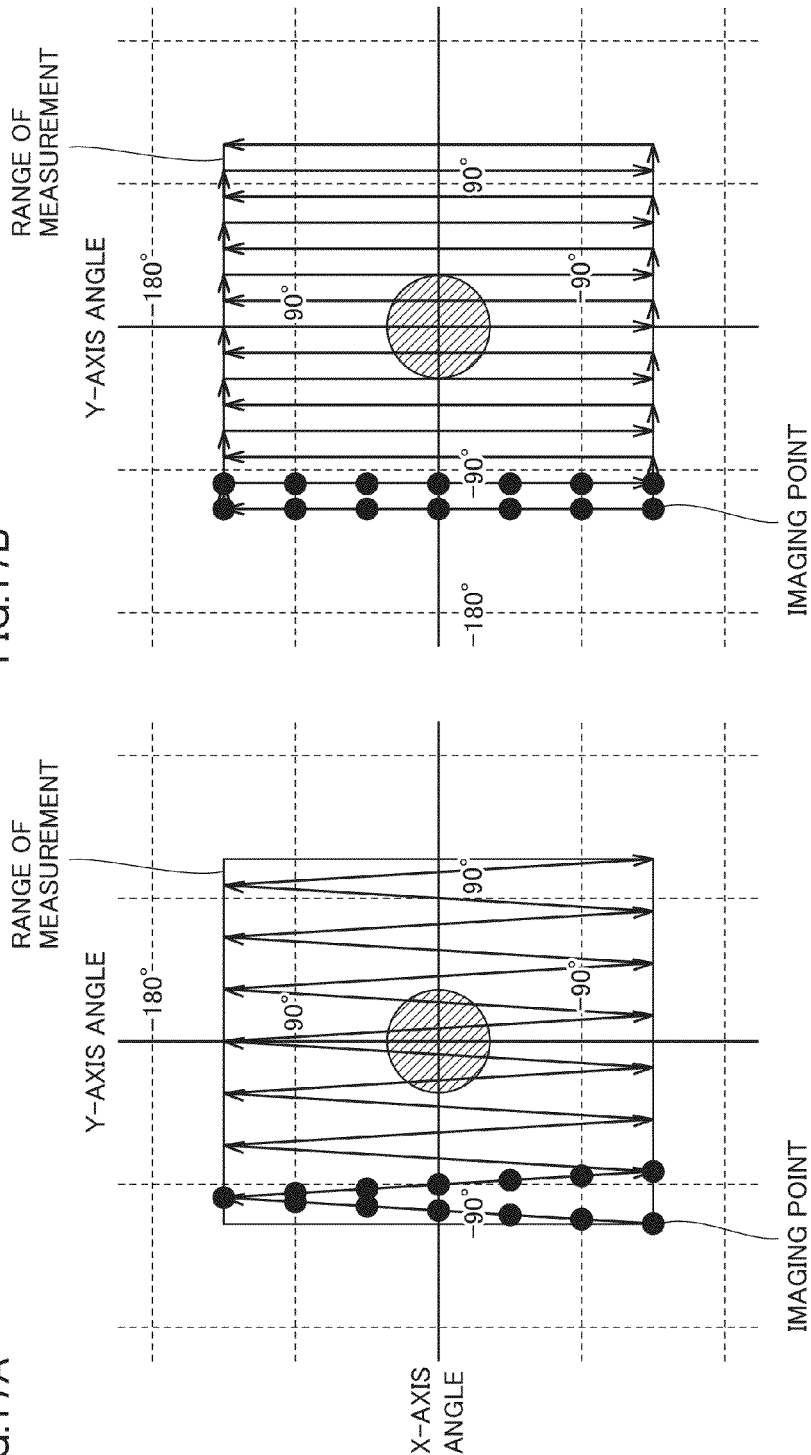

DIAGRAMMATIC REPRESENTATION
OF STORAGE OF LIGHT
DISTRIBUTION DATA

X-Y COORDINATE SYSTEM

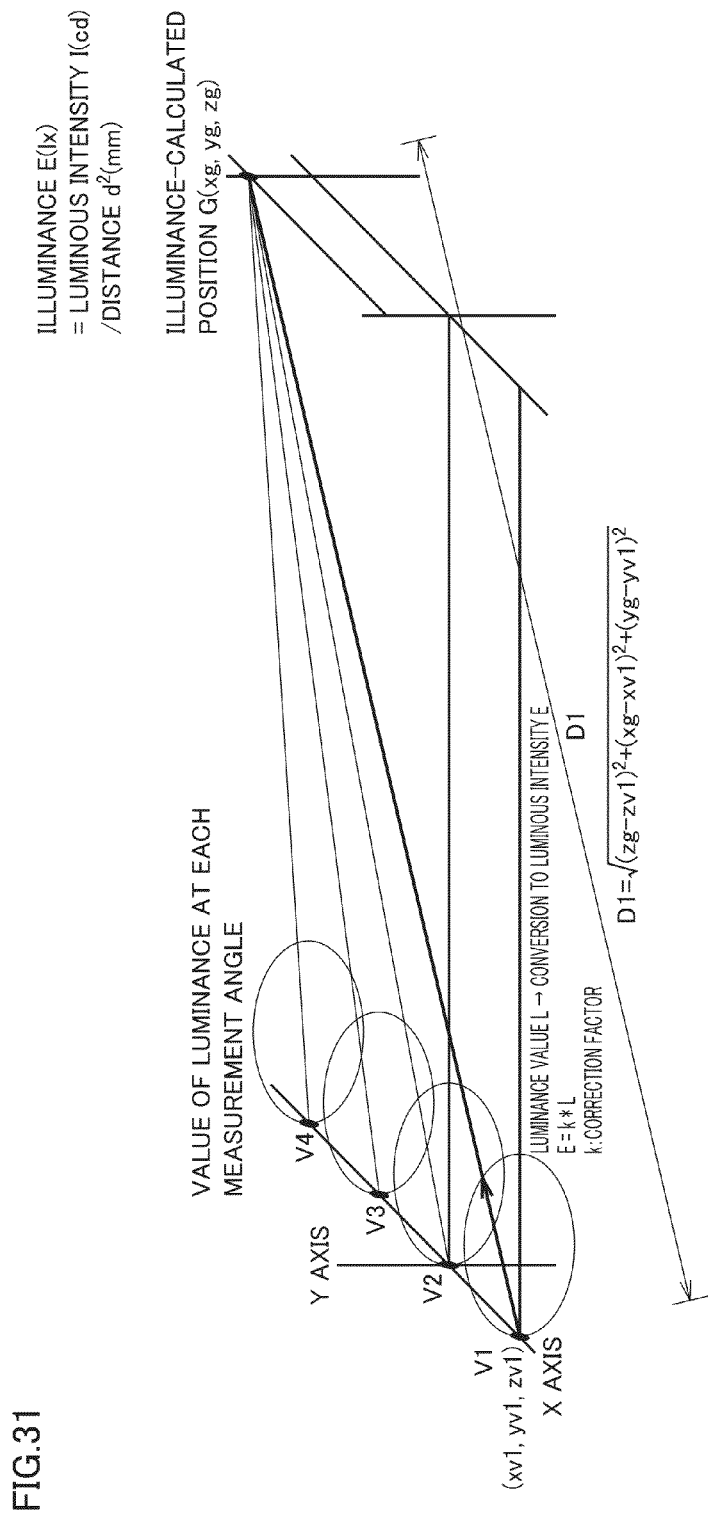

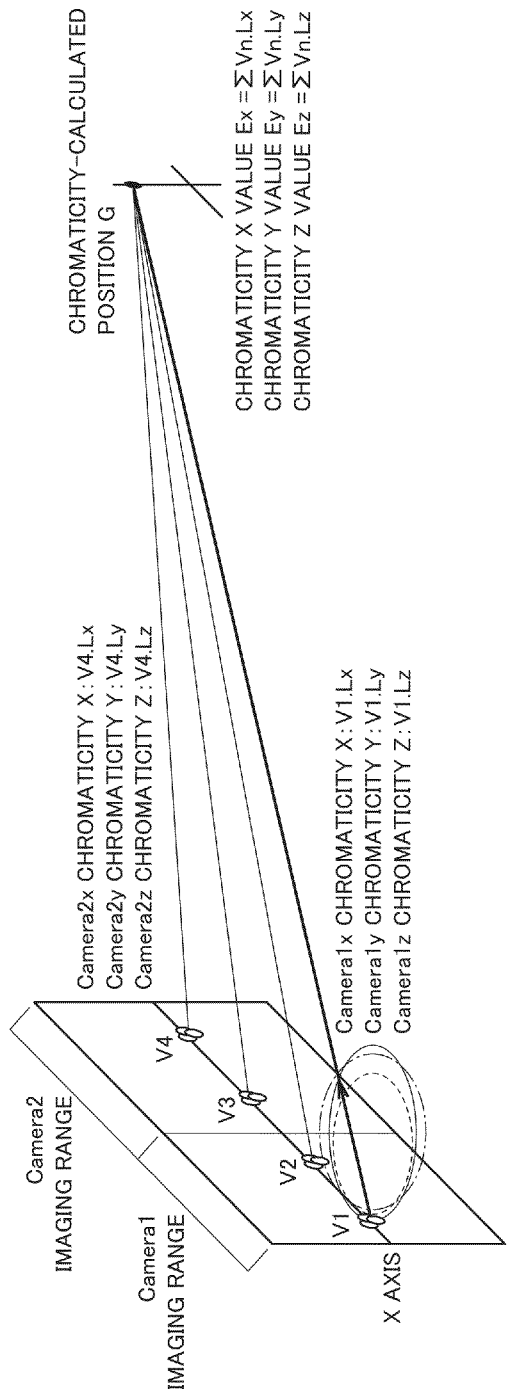

LIGHT DISTRIBUTION CHARACTERISTIC MEASUREMENT APPARATUS AND LIGHT DISTRIBUTION CHARACTERISTIC MEASUREMENT METHOD

BACKGROUND OF THE INVENTION

1. Field of the Invention

The present invention relates to a light distribution characteristic measurement apparatus and a light distribution characteristic measurement method for measuring the light distribution characteristic of a light source.

2. Description of the Background Art

The light distribution characteristic is known as one of the characteristics of light emitted from a light source. The light distribution characteristic means a spatial distribution of the luminous intensity (or luminance) of a light source. As such a light distribution characteristic, both the absolute-value-based light distribution and the relative-value-based light distribution are used. The absolute-value-based light distribution is a measurement of the spatial distribution of the absolute value of the luminous intensity and is used in such a case where the total luminous flux generated by a light source is to be determined. In contrast, the relative-value-based light distribution is a measurement of the spatial distribution of the relative value of the luminous intensity, and is used in such a case where the light distribution pattern is to be determined. Generally, it is not easy to measure the light distribution characteristic of light sources such as a light source having a complicated light distribution pattern and a light source whose characteristics are not known.

Regarding such a measurement of the light distribution, Japanese Patent Laying-Open No. 2008-70290 for example discloses a space-saving apparatus having a mechanism that rotates by 360° a light emission source sample to be measured, and enabling a three-dimensional light distribution characteristic to be measured by moving an optical receiver in one direction by only ±90° with respect to the Z axis (see [ABSTRACT] for example).

SUMMARY OF THE INVENTION

It is not easy for the apparatus disclosed in the above-referenced prior art document to measure the light distribution characteristic of a light source whose light emission surface is relatively large. Namely, when an apparatus is configured to measure the light distribution characteristic of a light source with a relatively large light emission surface, the apparatus involves problems of an increased complexity and an increased size of the apparatus.

An object of the present invention is to provide a light distribution characteristic measurement apparatus capable of efficiently measuring the light distribution characteristic of a light source without having an enlarged configuration, as well as a light distribution characteristic measurement method therefor.

In accordance with an aspect of the present invention, there is provided a light distribution characteristic measurement apparatus for measuring a light distribution characteristic of a light source. The light distribution characteristic measurement apparatus includes a plurality of detectors arranged so that the detectors have a predetermined relative relationship with each other. One detector has a detection range at least partially overlapping a detection range of another detector adjacent to the one detector. The light distribution characteristic measurement apparatus further includes: a drive unit that drives the plurality of detectors as one unit to update a positional relationship of the plurality of detectors relative to the light source; and a calculation unit that calculates the light distribution characteristic of the light source by performing a process depending on at least one of the relative relationship between the plurality of detectors and overlapping of respective detection ranges of the plurality of detectors, based on respective results of detection that have been acquired by the plurality of detectors at the same timing.

Preferably, the plurality of detectors are arranged so that respective optical axis directions are parallel to each other and each detector has a detection range partially overlapping a detection range of another detector.

More preferably, among respective results of calculation made from results of detection by relevant multiple detectors with regard to one of the overlapping detection ranges, only one result of calculation is made effective.

Alternatively, it is preferable that the plurality of detectors are arranged so that respective optical axis directions are directed to a predetermined reference point and respective detection ranges are substantially identical to each other.

More preferably, the calculation unit stores a first detection result acquired by a first detector at a certain timing, in association with positional information about the first detector, and stores a second detection result acquired by a second detector at the timing, in association with positional information that is obtained by correcting the positional information about the first detector based on the relative relationship between the first detector and the second detector.

Preferably, the calculation unit calculates the light distribution characteristic at each of a plurality of measurement points included in a detection range of a detector.

Preferably, the drive unit changes the positional relationship between the light source and the plurality of detectors in two different axial directions independently of each other.

According to another aspect of the present invention, there is provided a light distribution characteristic measurement method for measuring a light distribution characteristic of a light source. The light distribution characteristic measurement method includes the steps of: arranging a plurality of detectors so that the detectors have a predetermined relative relationship with each other and one detector has a detection range at least partially overlapping a detection range of another detector adjacent to the one detector; updating a positional relationship of the plurality of detectors relative to the light source by driving the plurality of detectors as one unit; and calculating the light distribution characteristic of the light source by performing a process depending on at least one of the relative relationship between the plurality of detectors and overlapping of respective detection ranges of the plurality of detectors, based on respective results of detection that have been acquired by the plurality of detectors at the same timing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B are diagrams for explaining a method for measuring the light distribution characteristic of a light source with a camera and an illuminometer respectively in accordance with a relevant art of the present embodiment.

FIGS. 6A and 6B are diagrams showing example images taken at respective positions where the cameras are installed as shown in FIGS. 5A and 5B.

FIG. 16 is a flowchart showing the whole process procedure for measuring the light distribution characteristic by means of the light distribution characteristic measurement apparatus of the present embodiment.

FIGS. 17A and 17B are diagrams for explaining how X-axis/Y-axis movements are made in the light distribution characteristic measurement apparatus of the present embodiment.

FIG. 31 is a diagram for explaining a process of adding the luminous intensity to illuminance storage data in FIG. 26.

FIG. 34 is a diagram for explaining a process of adding the luminous intensity when a plurality of camera groups are used.

DESCRIPTION OF THE PREFERRED EMBODIMENTS

Figure 1:
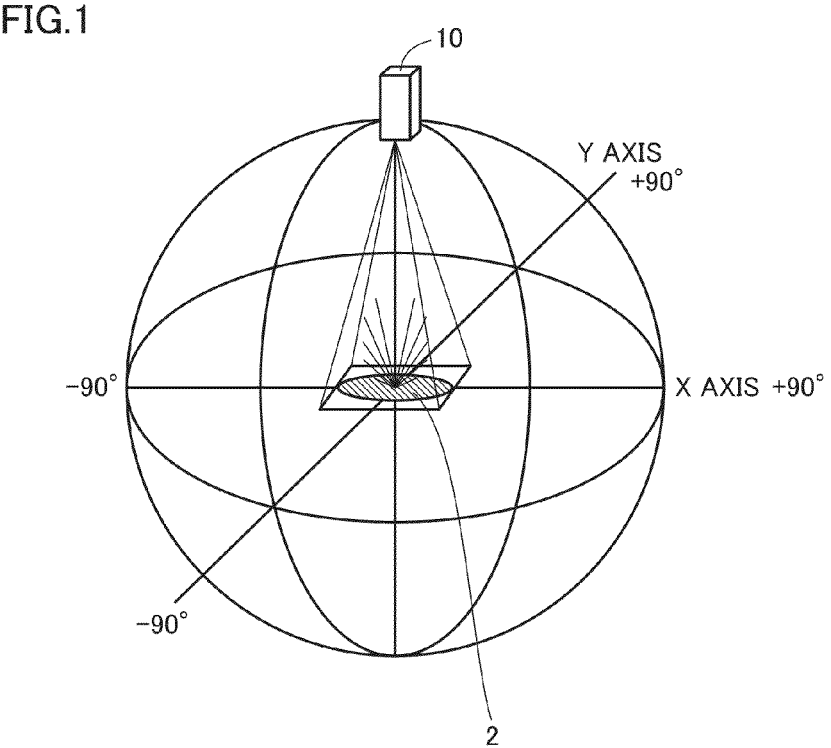
FIG. 1 is a diagram for explaining a method for measuring the light distribution characteristic of a light source with one camera in accordance with a relevant art of the present embodiment.

An embodiment of the present invention will be described in detail with reference to the drawings. In the drawings, the same or corresponding components are denoted by the same reference characters, and a description thereof will not be repeated.

In connection with the present embodiment, a light distribution characteristic measurement apparatus capable of measuring the light distribution characteristic (typically luminance distribution characteristic) of a sample light source (hereinafter also referred to simply as "light source") will chiefly be illustrated by way of example. It should be noted that the light distribution characteristic measurement apparatus of the present embodiment is capable of measuring not only the mere light distribution characteristic but also a variety of optical characteristics, which are calculated from the light distribution characteristic, such as light source's chromaticity and wavelength information as well as the total luminous flux emitted from the light source.

A. Relevant Art

First, for the sake of understanding of the light distribution characteristic measurement apparatus of the present embodiment, a relevant art of the present embodiment will be described. A description will be given of a method for measuring the light distribution characteristic, as a relevant art of the present embodiment.

<<a1: Measurement of Light Distribution Characteristic in Accordance with the Relevant Art>>

FIG. 1 is a diagram for explaining a method for measuring the light distribution characteristic of a light source with one camera in accordance with the relevant art of the present embodiment. As shown in FIG. 1, camera 10 (a kind of two-dimensional sensor) having a predetermined imaging field of view can be used to measure the illuminance distribution characteristic (or luminous intensity distribution characteristic) of a light source 2 to be measured. In this case, camera 10 is installed at a position where the camera can take an image of the whole of a light emission surface of light source 2 and the camera's optical axis direction is perpendicular to the light emission surface. Here, with respect to an image taken by camera 10, the side-to-side direction is defined as X axis and the top-to-bottom direction is defined as Y axis. Further, the state in which the optical axis direction of camera 10 is perpendicular to the light emission surface of light source 2 is defined as a state in which X-axis angle=0° and Y-axis angle=0°. This state will hereinafter be referred to also as "initial state." While camera 10 is moved in a range of ±180° relative to each of the X axis and the Y axis, camera 10 can image light source 2 to thereby obtain the light distribution characteristic (luminance distribution characteristic) of the light emission surface of light source 2.

Figure 2A:
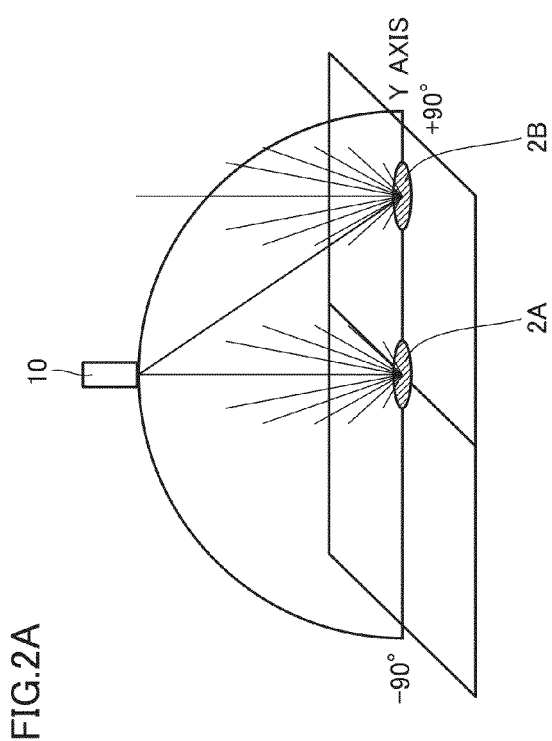
FIGS. 2A and 2B are diagrams for explaining a method for measuring the light distribution characteristic of a plurality of light emission surfaces with one camera in accordance with the relevant art of the present embodiment.
Figure 2B:
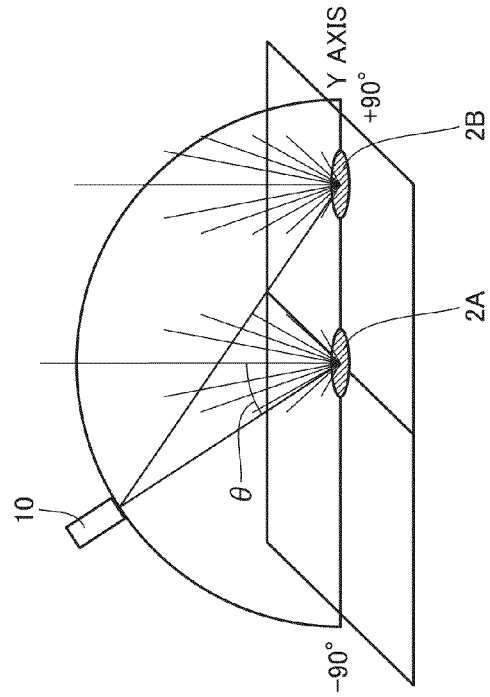

Next, consideration will be given to the case where a plurality of light emission surfaces are present. FIGS. 2A and 2B are diagrams for explaining a method for measuring the light distribution characteristic of a plurality of light emission surfaces with one camera in accordance with the relevant art of the present embodiment. In FIGS. 2A and 2B, there is shown a typical example of the case where a plurality of light emission surfaces are present, specifically a plurality of light sources 2A, 2B are arranged away from each other by a predetermined distance.

As shown in FIG. 2A, when camera 10 is installed at the position where both the X-axis angle and the Y-axis angle are 0°, the light distribution characteristic at 0° can be obtained, regarding the surface of light source 2A located to face camera 10. At this time, the light distribution characteristic of another light source 2B located in the imaging area of camera 10 can simultaneously be obtained. The light distribution angle at each point of observation corresponds to the angle formed by the position where camera 10 is installed and the light emission point.

Next, as shown in FIG. 2B, when camera 10 is moved on the Y axis by angle θ, the angle formed by them is an angle determined by adding angle θ of movement on the Y axis to each light distribution angle in the state where the Y-axis angle is 0°. Thus, camera 10 images light sources 2A, 2B while the angle is varied, and accordingly the light distribution angle at each point of observation is calculated. Based on these light distribution angles, the light distribution characteristic of the individual light source surface can be determined. The data obtained here is characteristics specific to each of light sources 2A, 2B to be measured.

FIGS. 3A and 3B are diagrams for explaining a method for measuring the light distribution characteristic of light source 2 with a camera and an illuminometer, respectively, in accordance with the relevant art of the present embodiment. Based on the light distribution characteristic of the light source surface which is obtained by the method as shown in FIG. 3A, it is possible to calculate the surface illuminance on the whole sphere located at a distance from which light source 2 can be regarded as a point light source. The light distribution characteristic inherently corresponds to the result of measurement at the distance from which the light emission surface of light source 2 can be regarded as a point. The result of measurement obtained in this way is the characteristic of distribution of the illuminance, which can be converted to the luminous intensity to thereby calculate the luminous intensity distribution characteristic. Thus, the calculation based on the light distribution characteristic of the light source surface can be used to calculate the illuminance at an arbitrary position.

<<a2. Disadvantages of the Relevant Art>>

When a camera (two-dimensional sensor) as shown in FIG. 3A is used to measure the light distribution characteristic, the light from light source 2 to be measured is collected by a lens and then received by the two-dimensional sensor. Based on the resultant received light, the surface luminance of light source 2 is measured. This method can be used to measure the surface luminance of light source 2 without dependence on the distance to light source 2. Further, in association with each position of a twin-axis goniometer, a two-dimensional sensor can be used to measure light source 2 in relation to the whole spherical surface/hemispherical surface centered at light source 2 and thereby obtain the characteristic of distribution of the surface luminance of light source 2. Furthermore, based on the characteristic of distribution of the surface luminance of light source 2, the illuminance at the distance from which light source 2 can be regarded as a point light source is calculated, the calculated illuminance is converted to the luminous intensity, and accordingly the luminous intensity distribution characteristic of light source 2 can be obtained.

Regarding this method, in order to enhance the spatial resolving power for the information about the light source surface, an approach is employed such as use of a high-resolution two-dimensional sensor and/or measurement with a closer distance to light source 2. In contrast, for a large light emission surface, an approach is employed such as increase of the distance between light source 2 and the camera (two-dimensional sensor) and/or use of a wide-angle lens for expanding the range of the field of view.

Moreover, in order to obtain more than one information item (such as chromaticity and wavelength information) from light source 2, an approach is employed such as mounting of an optical filter selectively at a stage preceding the camera (two-dimensional sensor) and/or taking measurements of two-dimensional sensors with different optical paths provided for the respective sensors by using a beam splitter or the like. The measurement of the light distribution by means of such a two-dimensional sensor (camera) has the following disadvantages.

(1) When the light distribution characteristic of a laterally-long light source such as fluorescent tube is to be measured by means of one camera, it is necessary to position the camera at a distance from the light source that is enough for the camera to image the whole light source. If the camera is installed so that its imaging range encompasses the whole light source, there is an extra space (information which cannot be used for measurement of the light source) along the direction perpendicular to the lateral direction of the imaging range, which results in degradation of the spatial resolving power.

(2) For a light source having a plurality of light emission points that are located away from each other, it is necessary to have a distance from which these light emission points can be imaged and/or to use a wide-angle lens capable of imaging these emission points, which results in degradation of the spatial resolving power.

(3) When an optical filter is mounted at a stage preceding the camera (two-dimensional sensor), it is necessary to appropriately switch the optical filter, and therefore, the total time required for measurement depends on the number of filters. When the beam splitter is used, there is an influence of decrease of the quantity of light or multi-reflection.

In contrast, when a point sensor (illuminometer) as shown in FIG. 3B is used to measure the light distribution characteristic, it is necessary to install the point sensor at the distance from which the sample light source can be regarded as a point light source. For a directional light source, it is necessary to install the point sensor at the distance where there is less or no influence of the directivity. The point sensor thus installed can be used to measure the illuminance and the measured illuminance can be converted to the luminous intensity to thereby acquire the luminous intensity distribution characteristic of the light source to be measured. The measurement of the light distribution characteristic by means of such a point sensor has the following disadvantages.

(1) For a larger light source, the point sensor has to be installed at a position further away from the light source, which results in an increased size of the measurement apparatus.

(2) Regarding a directional light source, the characteristic of the light source varies depending on the distance from the light source, and it is therefore difficult to accurately measure the light distribution characteristic.

(3) When a measurement is taken with the distance from the light source varied, the final result of measurement cannot be calculated in one measurement process.

B. Overview of the Present Embodiment

Figure 4A:
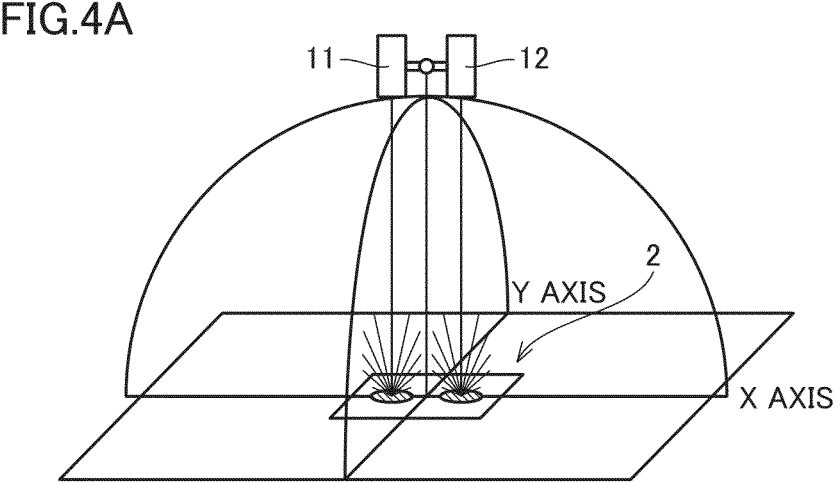
FIGS. 4A and 4B are diagrams for explaining an overview of a light distribution characteristic measurement apparatus of the present embodiment.
Figure 4B:
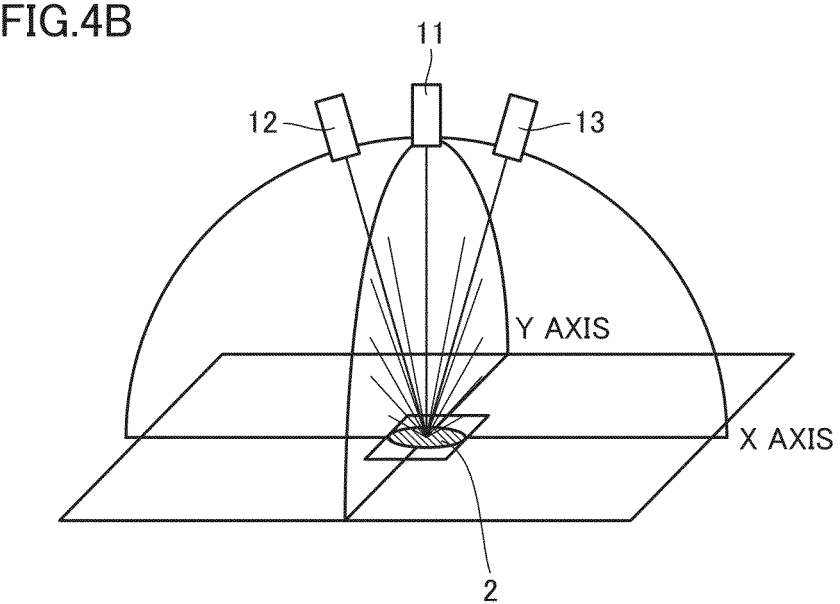

Next, an overview of a light distribution characteristic measurement apparatus of the present embodiment will be described. FIGS. 4A and 4B are diagrams for explaining the overview of the light distribution characteristic measurement apparatus of the present embodiment. Referring to FIGS. 4A and 4B, the light distribution characteristic measurement apparatus of the present embodiment uses a plurality of detectors (two-dimensional sensors/cameras) arranged so that they have a relative relationship with each other. As described later herein, the detection range of one detector is set so that the detection range at least partially overlaps the detection range of another detector adjacent to the former detector. FIG. 4A shows an example configuration suitable for measuring the light distribution characteristic of a light source with a large light emission surface and/or a light source having a plurality of light emission points. FIG. 4B shows an example configuration suitable for measuring a plurality of data items (such as chromaticity and wavelength information) about a light source. In the following, a brief description will be given of these example configurations.

<<b1: Light Source with Large Emission Surface/Light Source Having Multiple Light Emission Points>>

According to the above-described relevant art, when a relatively large light source is to be measured by means of one camera, an approach such as increase of the distance between the light source and the camera (two-dimensional sensor) and/or use of a wide-angle lens for expanding the range of the field of view is employed. Further, when a light source having a plurality of light emission points is to be measured by means of one camera as well, a similar approach is employed.

In contrast, according to the present embodiment as shown in FIG. 4A, a plurality of cameras 11, 12 arranged in parallel are used. Respective optical axis directions (the directions in which respective images are taken) of cameras 11, 12 are set so that they are identical to the direction perpendicular to the surface of the light source. Namely, a plurality of detectors (cameras 11, 12) are arranged so that respective optical-axis directions are parallel to each other and a part of the detection range of each detector overlaps the detection range of another detector.

Such cameras 11, 12 can be employed to efficiently image an area necessary for measuring the light distribution characteristic of the light source. Namely, cameras 11, 12 can be installed in parallel to image (measure) the light source in an enlarged state.

For example, when a laterally-long light source like a fluorescent tube is to be measured by means of one camera, the position where the camera is installed, for example, is adjusted so that the imaging range laterally encompasses the whole light source. If this adjustment is made, however, extra spaces (information which cannot be used for measurement of the light source) are generated along the direction perpendicular to the lateral direction of the imaging range, resulting in deterioration of the spatial resolving power. Further, there is a waste of time for transferring image data including the information which cannot be used for measurement of the light source.

In contrast, the method using a plurality of cameras 11, 12 in the present embodiment laterally arranges cameras 11, 12 next to each other for a laterally-long light source like a fluorescent tube as described above. Accordingly, the imaging range can more effectively be utilized to image the light source. In this way, the light distribution characteristic of the light source can efficiently be measured without deteriorating the spatial resolving power. Moreover, it is unnecessary to vary the distance to the light source or replace the lens depending on the size of the light source.

The light distribution characteristic measurement apparatus of the present embodiment has the following advantages.

(1) The light distribution characteristic can be measured with adequate spatial resolving power maintained, without being influenced by the size of the light source.

(2) For a light source having a plurality of light emission points located away from each other, cameras are installed for these light emission points respectively, and accordingly the light distribution characteristic can be measured with adequate spatial resolving power maintained.

(3) It is unnecessary to vary the distance from the camera to the light source depending on the size of the light source for example.

(4) It is unnecessary to change the lens type depending on the size of the light source for example.

(5) Even if the distance between light emission points is relatively large, cameras are installed for these emission points respectively, which makes it unnecessary to wastefully expand the measurement space.

(6) To an existing light distribution characteristic measurement apparatus, the same camera(s) as the existing one can be added to implement a light distribution characteristic measurement apparatus of the present embodiment.

<<b2: Measurement of Multiple Data Items (Such as Chromaticity and Wavelength Information)>>

According to the above-described relevant art, in order to obtain a plurality of information items (such as chromaticity and wavelength information) from a light source, an approach is employed such as mounting of an optical filter at a stage preceding the camera (two-dimensional sensor) and/or taking measurements of two-dimensional sensors with different optical paths provided for the respective sensors by using a beam splitter or the like. In contrast, according to the present embodiment as shown in FIG. 4B, a plurality of cameras 11, 12, 13 are installed one next to the other so that respective distances from the light source to the cameras are equal to each other, to thereby obtain a plurality of information items (such as chromaticity and wavelength information). More specifically, cameras 11, 12, 13 are arranged so that they are allowed to rotate by a common goniometer about the point corresponding to the position where light source 2 is installed. Respective optical axis directions (directions in which respective images are taken) of cameras 11, 12, 13 are directed to the rotational axis center (light source 2). Respective distances from cameras 11, 12, 13 to the rotational axis center are equal to each other. Namely, a plurality of detectors (cameras 11, 12, 13) are arranged so that respective optical axis directions are directed to a predetermined reference point (the center position where light source 2 is installed) and respective detection ranges are substantially identical to each other.

The angle formed between cameras adjacent to each other with respect to the rotational axis center is set so that the angle is identical to an integral multiple of the angular step (angle per movement) by which the goniometer rotationally drives cameras 11, 12, 13 at a time. Thus, cameras 11, 12, 13 are set to form an angle which is an integral multiple of the angular step. Therefore, when the goniometer is used to rotate cameras 11, 12, 13, each camera finally takes measurements at the same positions (space and angle) thereamong, and thus the same optical path can be reproduced.

Moreover, since cameras 11, 12, 13 can take respective images at the same time, the time required for the whole measurement can be shortened. Therefore, no restriction is imposed on the number of cameras to be installed, and a predetermined number of cameras may be installed depending on the required time for measurement, for example. Because of no restriction on the number of cameras, it is unnecessary to use a beam splitter or the like and measurements can be taken with high sensitivity without being influenced by decrease of the quantity of light and/or multi-reflection due to the beam splitter.

The light distribution characteristic measurement apparatus of the present embodiment has the following advantages.

(1) A camera(s) can simply be added to an existing light distribution characteristic measurement apparatus to additionally obtain necessary information.

(2) A camera(s) can simply be added to an existing light distribution characteristic measurement apparatus to take measurements at the same time, which can shorten the time required for the whole measurement.

C. Application

Next, a description will be given of an application of the light distribution characteristic measurement apparatus of the present embodiment described above. In connection with the following application, the case will be described where a headlight of an automobile is a sample light source.

<<c1: Measurement of Light Distribution Characteristic>>

Figure 5A:
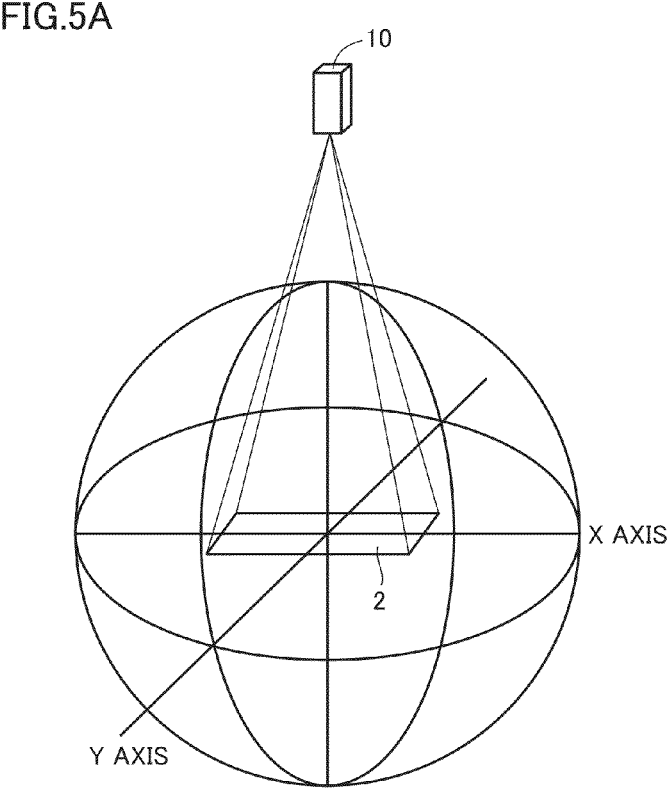
FIGS. 5A and 5B are diagrams for explaining the position where a camera is installed for imaging a light source.
Figure 5B:
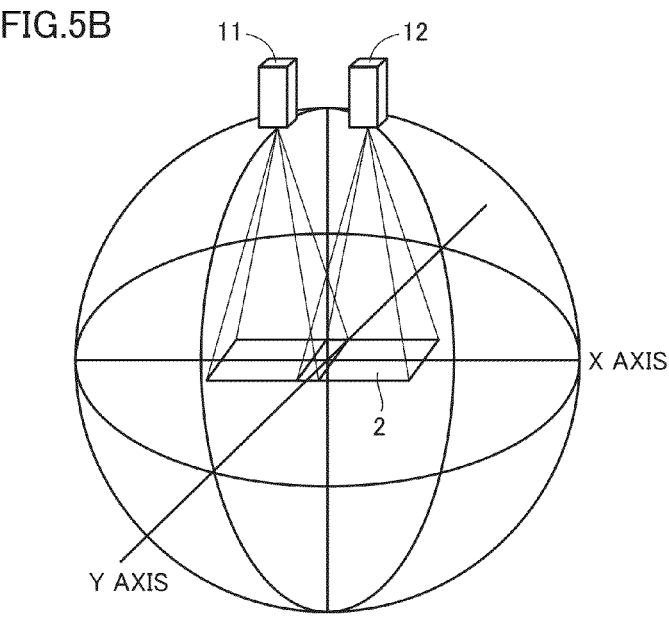

First, an example will be described where the light distribution characteristic of a headlight of an automobile is measured. FIGS. 5A and 5B are diagrams for explaining the position where a camera is installed for imaging a light source 2. FIGS. 6A and 6B are diagrams showing example images taken at respective positions where the cameras are installed as shown in FIGS. 5A and 5B.

Since the headlight of an automobile is laterally long, it is necessary, for imaging the whole of light source 2 by means of one camera 10, to install camera 10 away from light source 2 by a distance of about 900 mm. As shown in FIG. 5A, one camera 10 is installed so that the whole of light source 2 is encompassed within the imaging range of the camera. An image taken by camera 10 at this installation position is shown in FIG. 6A. It is seen that the image shown in FIG. 6A includes extra portions (information which cannot be used for measurement of light source 2) on the upper side and the lower side, which results in deterioration of the spatial resolving power.

In contrast, when two cameras 11, 12 arranged next to each other are used to image light source 2, respective imaging ranges of cameras 11, 12 are set so that the combined range made up of these imaging ranges encompasses the whole of light source 2 as shown in FIG. 5B. Namely, two cameras 11, 12 which are arranged so that respective optical axes are in the same direction as the direction perpendicular to the surface of light source 2 and also arranged in parallel to each other are used to take an enlarged image of light source 2. The images taken by cameras 11, 12 at the installation positions are shown in FIG. 6B. As to the images shown in FIG. 6B, the images of light source 2 which have been taken partially overlap each other. Thus, a plurality of cameras can be used to enlarge the imaging area. Accordingly, in the images taken by cameras 11, 12 respectively, the extra portions (information which cannot be used for measurement of light source 2) on the upper side and the lower side are reduced, which can improve the spatial resolving power.

Figure 7:
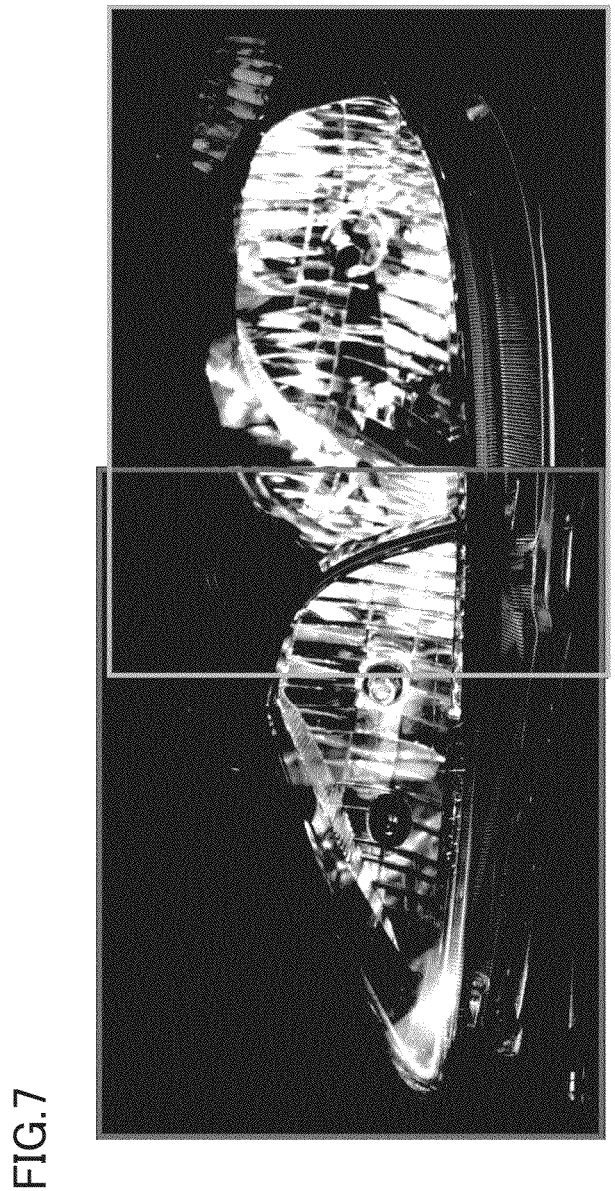
FIG. 7 is a diagram showing a combined image obtained by combining the images shown in FIG. 6B.

The images taken respectively by cameras 11, 12 are combined depending on respective imaging ranges of the cameras. FIG. 7 is a diagram showing a combined image obtained by combining the images shown in FIG. 6B. In FIG. 7, a state is shown where lamps of the headlight which is light source 2 have been turned off. As shown in FIG. 7, the images taken respectively by the two cameras arranged in parallel to each other can be combined to manage the resultant image similarly to an image obtained by imaging light source 2 by means of one camera. A process similar to this combining process is used to obtain the light distribution characteristic of light source 2.

<<c2: Measurement of Chromaticity>>

Figure 8:
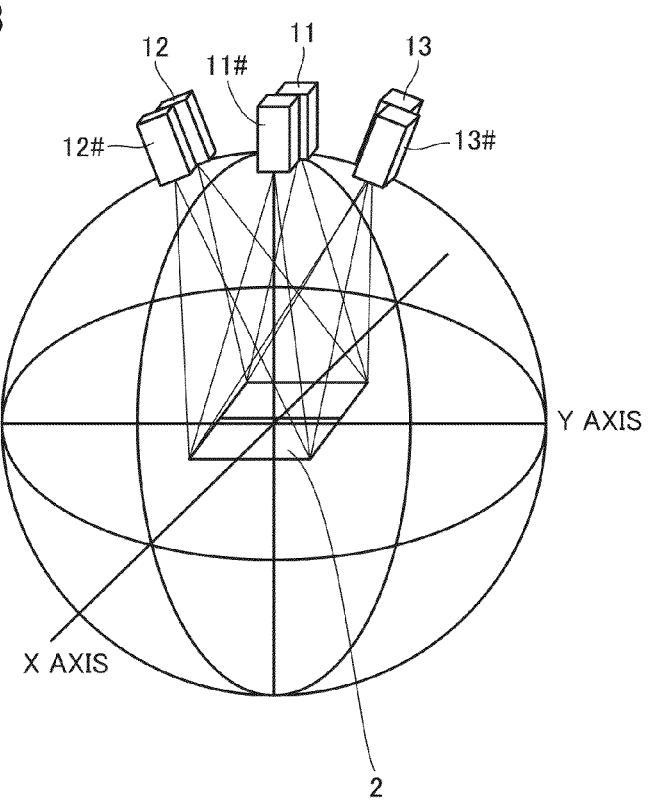
FIG. 8 is a diagram for explaining the positions where cameras are installed for measuring the chromaticity of a light source.

Next, an example where the chromaticity of light source 2 is measured will be described. FIG. 8 is a diagram for explaining the positions where cameras are installed for measuring the chromaticity of light source 2. When measurement of the chromaticity is to be conducted for light source 2, it is necessary to selectively attach to a camera three band-pass filters having characteristics of color matching functions corresponding to three colors of the light source to be measured and to take images through respective filters at the same position (space and angle).

When a camera is used to measure the chromaticity, it is necessary to conduct measurements for the same optical path. Therefore, according to the above-described relevant art, while successively changing the filter mounted for one camera, measurement is performed three times per position.

In contrast, according to the present embodiment, three cameras 11, 12, 13 are arranged next to each other as shown in FIG. 8 and band-pass filters are mounted for the cameras respectively. While three cameras 11, 12, 13 are rotated, the cameras at respective positions take respective images (measurements). At this time, cameras 11, 12, 13 are kept at the same distance from the center of rotation of a goniometer and installed so that respective optical axes are directed to the center of rotation. Accordingly, images of the same area can be taken simultaneously at a plurality of angles and the information about the chromaticity can be obtained.

Further, in the example configuration shown in FIG. 8, in order to shorten the time required for the whole measurement, two systems each including three cameras (a camera group) are arranged. Namely, in addition to cameras 11, 12, 13, cameras 11#, 12#, 13# are also arranged to image light source 2.

Figure 9:
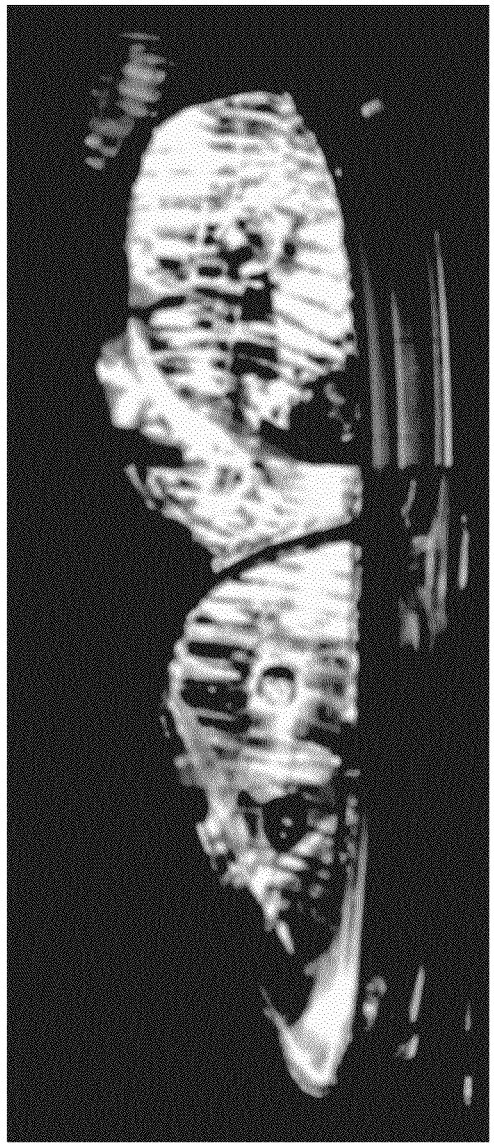
FIG. 9 is a diagram showing the result of measurement of the chromaticity that is obtained by combining images taken respectively by the cameras shown in FIG. 8.
Figure 10:
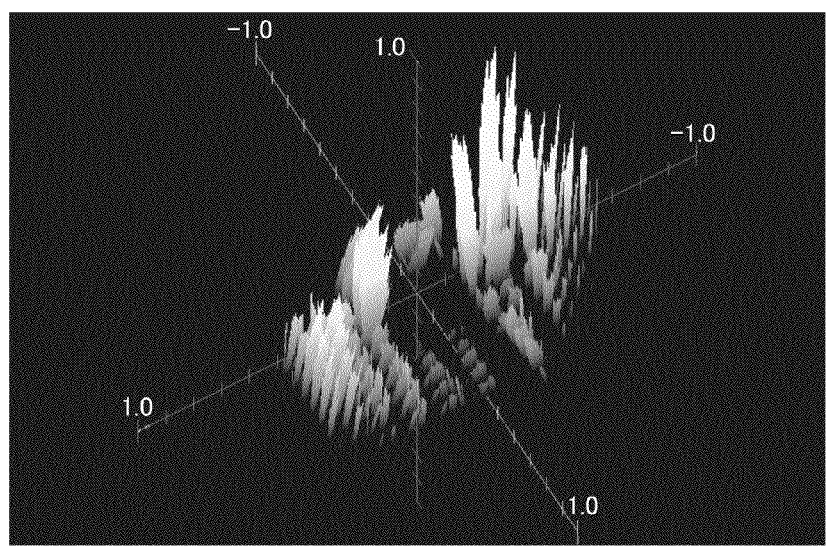
FIG. 10 is a diagram showing the light distribution characteristic of a light source surface that is calculated from the result of measurement of the chromaticity shown in FIG. 9.

FIG. 9 is a diagram showing the result of measurement of the chromaticity that is obtained by combining images taken respectively by cameras 11, 12, 13, 11#, 12#, 13# shown in FIG. 8. FIG. 9 shows the result of color synthesis of an image obtained by imaging light source 2 with camera 11 at the position where the X-axis angle=0° and the Y-axis angle=0°. FIG. 10 is a diagram showing the light distribution characteristic of the light source surface that is calculated from the result of measurement of the chromaticity shown in FIG. 9.

Figure 11:
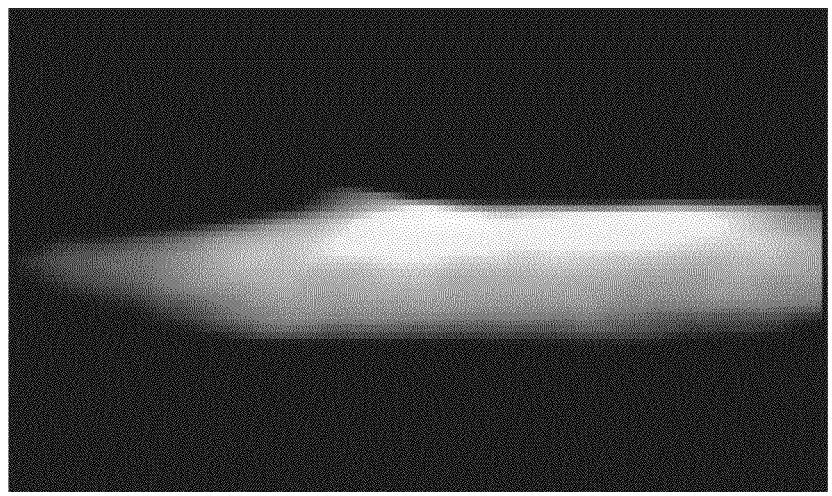
FIG. 11 is a diagram showing the result of calculation of the illuminance on a wall surface that is calculated from the light distribution characteristic shown in FIG. 10.

FIG. 11 is a diagram showing the illuminance on a wall surface calculated from the light distribution characteristic shown in FIG. 10.

As shown in FIG. 8, six cameras 11, 12, 13, 11#, 12#, 13# are used to image light source 2 to thereby enable measurement of the chromaticity to be performed with higher spatial resolving power. The combined image shown in FIG. 9 is made up of three chromaticity data items. Based on these data items, images of the sample light source in the state where the X-axis angle=0° and the Y-axis angle=0° (initial state) are color-synthesized, which provides the result as shown in FIG. 10. The result shown in FIG. 10 is obtained by calculation from the result of imaging by six cameras 11, 12, 13, 11#, 12#, 13#, and is a characteristic specific to light source 2. The light distribution characteristic shown in FIG. 10 corresponds to the state where only the low beam lamp of the headlight is turned on, and this result of calculation well reproduces the actual sample light source.

Further, based on the light distribution characteristic shown in FIG. 10, the illuminance distribution obtained when a wall located away from light source 2 by 25 m is illuminated with light source 2 is calculated. The result of the calculation is shown in FIG. 11. It has been confirmed that the illuminance on the wall surface as shown in FIG. 11 that has been calculated from the light distribution characteristic well represents the actual wall-surface illuminance.

D. Configuration of Light Distribution Characteristic Measurement Apparatus

Next, a configuration of the light distribution characteristic measurement apparatus of the present embodiment will be described. The light distribution characteristic measurement apparatus has a drive unit that drives a plurality of detectors (cameras 11, 12, 13) as one unit to thereby update the positional relationship between a plurality of detectors (cameras 11, 12, 13) and light source 2. In the following description, a light-source-moving type which rotationally moves a light source with cameras (detectors) fixed, and a detector-moving type which rotationally moves cameras (detectors) with a light source fixed will be illustrated as examples of the drive unit. The drive unit changes the positional relationship (relative relationship) between light source 2 and a plurality of detectors (cameras 11, 12, 13) in two different axial directions (X-axis direction and Y-axis direction in the following example) independently of each other.

The cameras typically have a two-dimensional sensor such as CCD (Charge Coupled Device) image sensor or CMOS (Complementary Metal Oxide Semiconductor) image sensor.

<<d1: Light-Source-Moving Type>>

Figure 12:
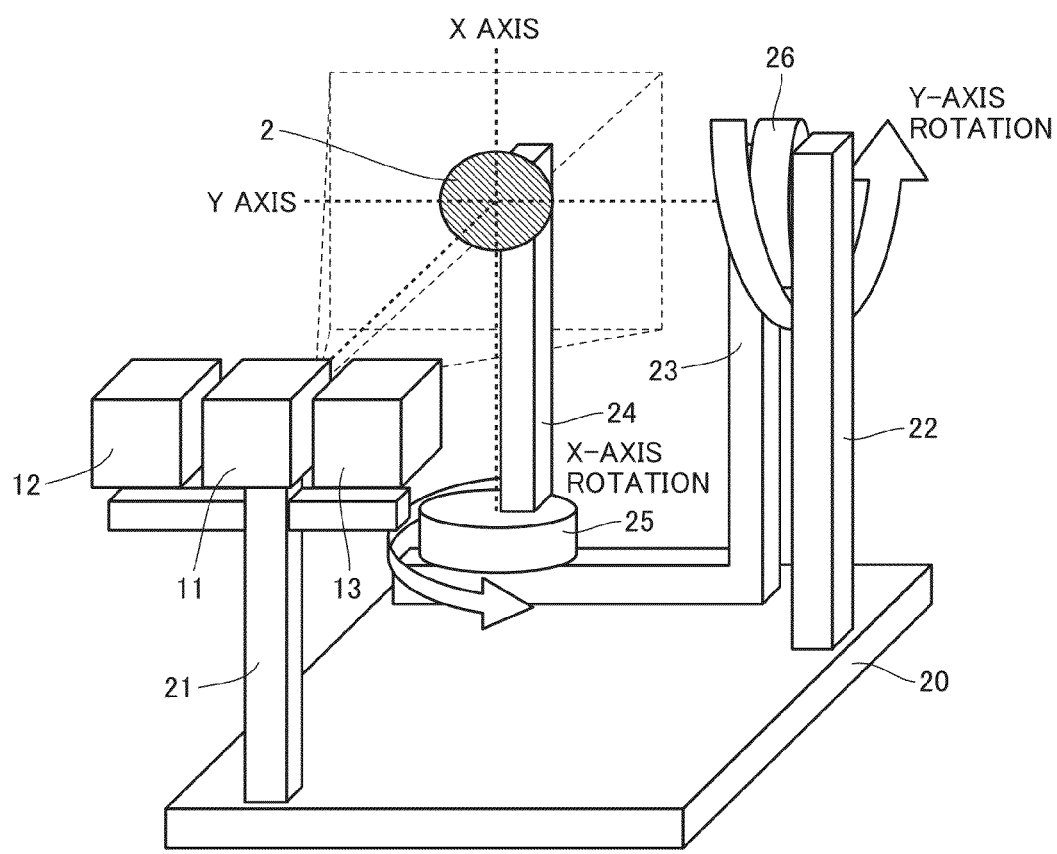
FIG. 12 is a schematic diagram showing an example configuration (light-source-moving type) of the light distribution characteristic measurement apparatus of the present embodiment.

FIG. 12 is a schematic diagram showing an example configuration (light-source-moving type) of a light distribution characteristic measurement apparatus 1A of the present embodiment. Light distribution characteristic measurement apparatus 1A shown in FIG. 12 has a goniometer to which light source 2 is attached and which rotates this attached light source 2 relative to cameras (detectors).

More specifically, light distribution characteristic measurement apparatus 1A includes a base 20, three cameras 11, 12, 13, a detector support unit 21 attached to base 20 and supporting cameras 11, 12, 13, a Y-axis support unit 22 attached to base 20, a Y-axis motor 26 connected to Y-axis support unit 22, a Y-axis rotational arm 23 rotated by Y-axis motor 26, an X-axis motor 25 connected to a leading end of Y-axis rotational arm 23, and a light source support unit 24 rotated by X-axis motor 25. At the intersection of respective rotational axes of X-axis motor 25 and Y-axis motor 26, light source 2 is disposed. Rotation of X-axis motor 25 and rotation of Y-axis motor 26 cause light source 2 to freely rotate with respect to the X-axis and the Y-axis. It should be noted that the center position of light source 2 is kept at the intersection even while X-axis rotation or Y-axis rotation is made. Accordingly, the relative relationship between light source 2 and cameras 11, 12, 13 is freely changed.

<<d2: Detector-Moving Type>>

Figure 13:
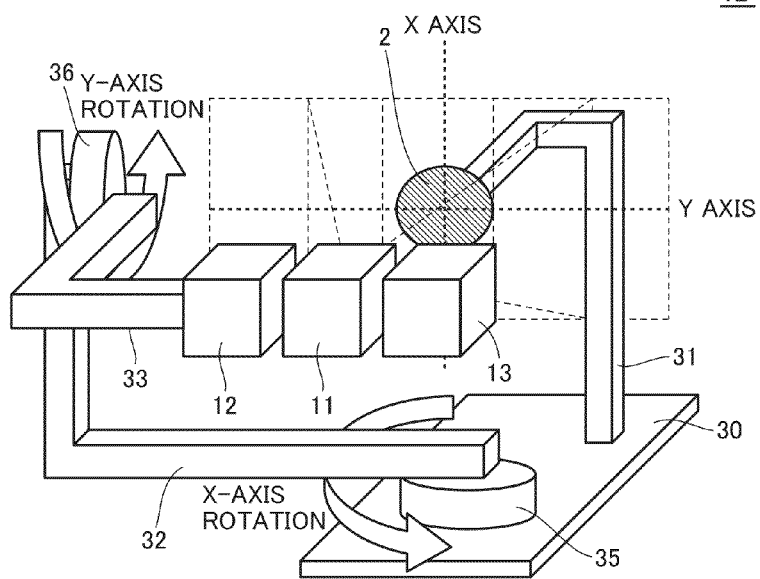
FIG. 13 is a schematic diagram showing an example configuration (detector-moving type) of the light distribution characteristic measurement apparatus of the present embodiment.

FIG. 13 is a schematic diagram showing an example configuration (detector-moving type) of a light distribution characteristic measurement apparatus 1B of the present embodiment. Light distribution characteristic measurement apparatus 1B shown in FIG. 13 has a goniometer to which cameras (detectors) are attached and which rotates the attached cameras relative to light source 2.

More specifically, light distribution characteristic measurement apparatus 1B includes a base 30, three cameras 11, 12, 13, a detector support arm 33 supporting cameras 11, 12, 13, a Y-axis motor 36 rotating detector support arm 33, an X-axis rotational arm 32 having one end connected to Y-axis motor 36 and rotated by an X-axis motor 35, and X-axis motor 35 disposed on base 30. At the intersection of respective rotational axes of X-axis motor 35 and Y-axis motor 36, cameras 11, 12, 13 (actually camera 11) are disposed. Rotation of X-axis motor 35 and rotation of Y-axis motor 36 cause cameras 11, 12, 13 to freely rotate with respect to the X-axis and the Y-axis. It should be noted that the center position of light source 2 is kept at the intersection even while X-axis rotation or Y-axis rotation is made. Accordingly, the relative relationship between light source 2 and cameras 11, 12, 13 is freely changed.

E. Electrical Configuration of Light Distribution Characteristic Measurement Apparatus Next, an electrical configuration of the light distribution characteristic measurement apparatus of the present embodiment will be described.

<<e1: Electrical Configuration of the Whole Light Distribution Characteristic Measurement Apparatus>>

Figure 14:
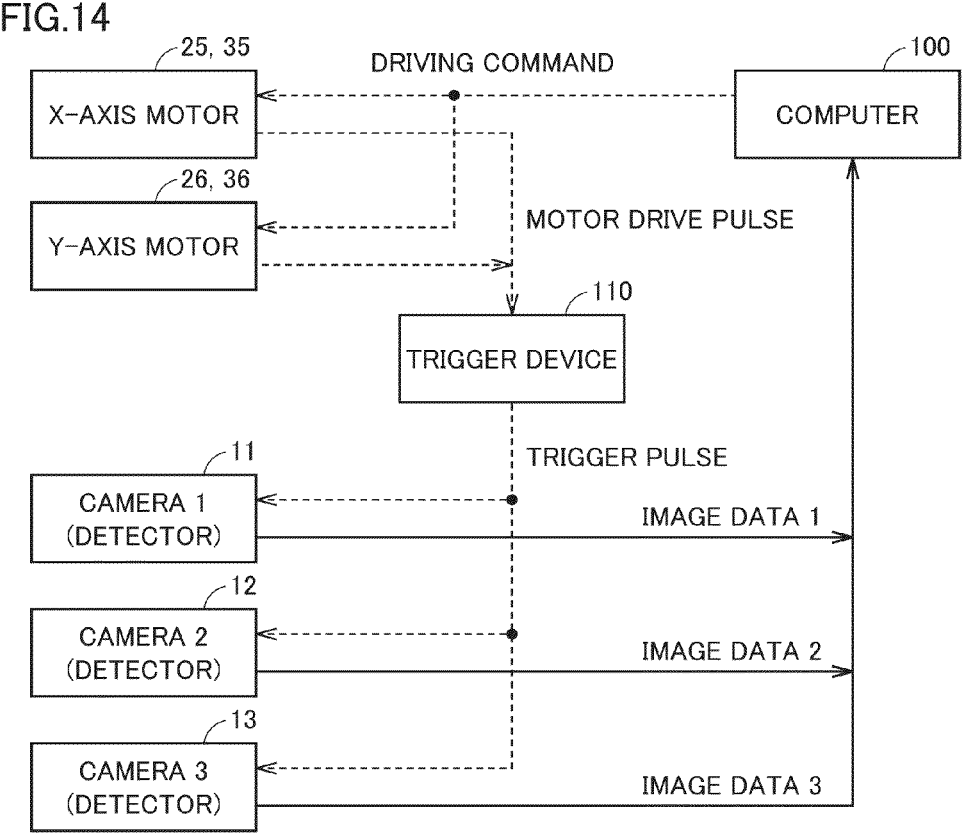
FIG. 14 is a schematic diagram showing an electrical configuration of the light distribution characteristic measurement apparatus of the present embodiment.

FIG. 14 is a schematic diagram showing an electrical configuration of the light distribution characteristic measurement apparatus of the present embodiment. Referring to FIG. 14, the light distribution characteristic measurement apparatus of the present embodiment includes a computer 100 and a trigger device 110, in addition to above-described X-axis motors 25, 35 and Y-axis motors 26, 36 as well as cameras 11, 12, 13.

Computer 100 has a capability of controlling rotation of the goniometer and also a capability of acquiring and processing image data obtained through imaging by cameras 11, 12, 13. Trigger device 110 manages the imaging timing at which imaging is done by cameras 11, 12, 13, in accordance with a change, made by the goniometer, of the relative relationship between light source 2 and cameras 11, 12, 13. Although the capability of trigger device 110 may be implemented by computer 100, it is preferable to arrange trigger device 110 including a dedicated hardware circuit, separately from computer 100, in order to more accurately control the imaging timing (imaging position).

More specifically, computer 100 outputs a driving command to each of X-axis motor 25 (or X-axis motor 35) and Y-axis motor 26 (or Y-axis motor 36). This driving command includes the speed at which the X-axis motor and the Y-axis motor are moved and/or a target position, for example. In the present embodiment, it is necessary to take measurements across the whole spherical surface/hemispherical surface centered at light source 2, and therefore, the driving command includes an instruction for repeating a reciprocal motion relative to the X-axis until a series of movements relative to the Y axis is completed. Computer 100 outputs the driving command at each timing at which transmission should be started, and the X-axis motor and the Y-axis motor having received the driving command (as well as motor drivers which drive the X-axis motor and the Y-axis motor) start moving. The X-axis motor and the Y-axis motor each output a motor drive pulse indicating its amount of rotation to trigger device 110.

Trigger device 110 divides the received motor drive pulse by a predetermined number to calculate the current position (angle) along the X axis and the Y axis and also outputs, at the angular intervals corresponding to predetermined measurement points, a trigger pulse to cameras 11, 12, 13 for instructing them to take images.

Receiving the trigger pulse from trigger device 110, cameras 11, 12, 13 each take an image and outputs to computer 100 image data obtained by taking the image. Each time cameras 11, 12, 13 receive the trigger pulse from trigger device 110, cameras 11, 12, 13 repeat imaging and transmission of the image data. Based on the order in which image data are taken, computer 100 identifies the position (space and angle) where the image has been taken for measurement. Then, computer 100 processes the obtained image data in the following manner to thereby calculate characteristics of light source 2.

The electrical configuration as shown in FIG. 14 is employed to thereby avoid increase of the load of control of the imaging timing by computer 100 even if a large number of cameras are installed at the goniometer, and therefore, there is less restriction on the number of installed cameras.

An alternative configuration may be provided in which computer 100 may give the trigger pulse to one camera to allow this camera to transfer the received trigger pulse to any of the remaining cameras. The configuration in which the trigger pulse is thus transferred can be employed to thereby successively transfer the trigger pulse from the camera, which is connected to computer 100, to the camera located at the opposite end. In this way, the configuration can be provided to allow each camera to branch the trigger pulse and provide it to the following camera successively, which makes it easier to add cameras.

<<e2: Electrical Configuration of Computer 100>>

Figure 15:
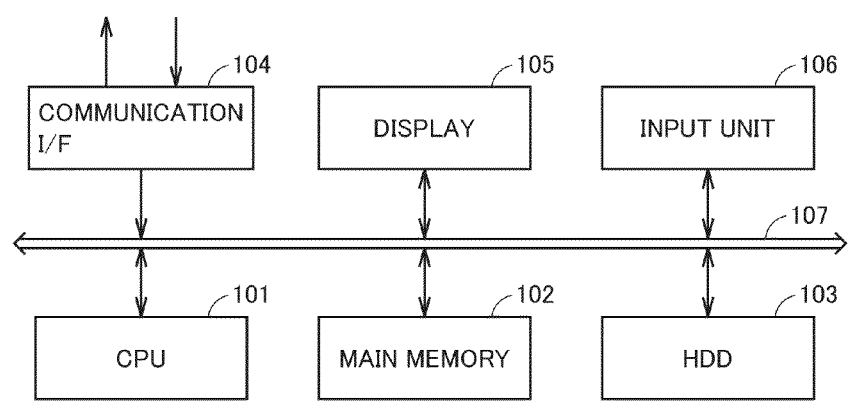
FIG. 15 is a schematic diagram showing an internal configuration of a computer shown in FIG. 14.

FIG. 15 is a schematic diagram showing an internal configuration of computer 100 shown in FIG. 14. Computer 100 is typically configured of a general-purpose personal computer. More specifically, referring to FIG. 15, computer 100 includes a CPU (Central Processing Unit) 101, a main memory 102, an HDD (Hard Disk Drive) 103, a communication interface (I/F) 104, a display 105, and an input unit 106. These components are connected to each other via a bus 107 so that they can communicate with each other.

CPU 101 is a processor which executes a program stored in HDD 103 for example to thereby implement capabilities of the present embodiment. Main memory 102 provides a working area necessary for CPU 101 to execute the program. In this working area, temporary data necessary for execution of the program and image data to be processed, for example, are stored. HDD 103 stores in a non-volatile manner a program executed by CPU 101 and parameters necessary for execution of processing, for example.

In HDD 103, the program executed by CPU 101 is installed in advance. For installation of the program, a variety of methods may be employed. For example, a method according to which a program stored in any of a variety of recording media such as CD-ROM (Compact Disk Read Only Memory) or DVD (Digital Versatile Disk) is read by an associated device and stored in HDD 103, or a method according to which the program is downloaded via a network, for example, may be employed.

Communication interface 104 communicates data with other devices. Specifically, communication interface 104 outputs the driving command to the X-axis motor and the Y-axis motor and receives image data obtained through imaging by cameras.

Display 105 displays the image data obtained by imaging as well as the result of measurement. Specifically, display 105 is configured of an LCD (Liquid Crystal Display) or CRT (Cathode Ray Tube), for example. Input unit 106 accepts operation by a user. Specifically, input unit 106 is configured of a mouse and/or keyboard, for example. To computer 100, another output device such as printer may be connected as required.

A variety of capabilities of the present embodiment may be implemented entirely or partially by means of a dedicated processor or IC (Integrated Circuit), for example, instead of implemented by being provided through execution of a program by CPU 101. Instead, it may be implemented by means of a dedicated LSI (Large Scale Integration).

F. Whole Process Procedure

In the following, a description will be given of a process procedure for measuring the light distribution characteristic of light source 2 by means of the light distribution characteristic measurement apparatus of the present embodiment.

FIG. 16 is a flowchart showing the whole process procedure for measuring the light distribution characteristic by means of the light distribution characteristic measurement apparatus of the present embodiment. As a preliminary preparation, a plurality of detectors (cameras) are arranged so that they have a predetermined relative relationship with each other and at least a part of the detection range of one detector overlaps the detection range of another detector adjacent to the former detector. Each step shown in FIG. 16 is performed by CPU 101 of computer 100 and trigger device 110.

Referring to FIG. 16, in response to an instruction to start measurement, CPU 101 of computer 100 outputs the driving command to the Y-axis motor to cause a movement with respect to the Y axis to start (step S1). Subsequently, CPU 101 of computer 100 outputs the driving command to the X-axis motor to cause a movement with respect to the X axis to start (step S2). In steps S1 and S2, rotational drive movements with respect to the X axis and the Y axis are each made by a predetermined angular step (an angle per movement) at a time in a predetermined angular range (typically ±180° for each of the X axis and the Y axis). Details of the X-axis movement and the Y-axis movement will be described later herein.

Subsequently, trigger device 110 determines whether or not the X-axis movement has been made by a predetermined angular step (step S3). More specifically, trigger device 110 counts the motor drive pulse from the X-axis motor and determines whether or not the value of the count has been incremented by a value corresponding to the predetermined angular step. When the X-axis movement has not been made by the predetermined angular step (NO in step S3), the processes are repeated from step S2.

When the X-axis movement has been made by the predetermined angular step (YES in step S3), trigger device 110 outputs the trigger pulse to each of cameras 11, 12, 13 (step S4). Cameras 11, 12, 13 each take an image upon receiving the trigger pulse (step S5), and output the image data obtained by taking the image, to computer 100 (step S6). Namely, cameras 11, 12, 13 each receive the trigger pulse to thereby start taking an image (measurement).

Computer 100 stores the image data received from cameras 11, 12, 13, respectively, calculates the luminance at a measurement point corresponding to the timing at which the trigger pulse was output, and stores the luminance as light distribution characteristic data (step S7).

In this step S7, based on the results of detection (respective images having been taken) that were obtained at the same timing by a plurality of detectors (cameras 11, 12, 13), processing is performed based on at least one of the relative relationship between a plurality of detectors and overlapping of the detection ranges thereof, to thereby calculate the light distribution characteristic of light source 2. Details of this data storage process will be described later herein.

Subsequently, trigger device 110 determines whether or not the X-axis movement in the predetermined angular range has been completed (step S8). When the X-axis movement in the predetermined angular range has not been completed (NO in step S8), the processes are repeated from step S2. Namely, after the series of processes shown in steps S4 to S7 is completed, the X-axis movement is made to the next position and similar processes are performed.

In contrast, when the X-axis movement in the predetermined angular range has been completed (YES in step S8), trigger device 110 determines whether or not the Y-axis movement in the predetermined angular range has been completed (step S9). When the Y-axis movement in the predetermined angular range has not been completed (NO in step S9), the processes are repeated from step S1. Namely, when the process of taking measurements in the predetermined angular range with respect to the X axis is completed, the Y-axis movement is made to the next position and the series of operations is repeated, starting from the initial position relative to the X axis.

In contrast, when the Y-axis movement in the predetermined angular range has been completed (YES in step S9), the illuminance is calculated based on the data stored in step S7 (step S10). Namely, when the measurement performed by causing both the X-axis movement and the Y-axis movement has been completed, the illuminance is calculated. Then, the whole process is completed.

G. How X-Axis/Y-Axis Movements are Made

Subsequently, a description will be given of how the X-axis and Y-axis movements shown in steps S1 and S2 are made. FIGS. 17A and 17B are diagrams for explaining how the X-axis/Y-axis movements are made in the light distribution characteristic measurement apparatus of the present embodiment. FIG. 17A shows, as an example of the way to make the movements, a system for simultaneously making both the X-axis movement and the Y-axis movement (two-axis simultaneous driving system). FIG. 17B shows, as another example thereof, a system for independently making one of the X-axis movement and the Y-axis movement (single-axis independent driving system).

Regarding the two-axis simultaneous driving system shown in FIG. 17A, there is no stoppage with respect to the Y-axis direction, which provides an advantage that the state in which the camera shakes upon stoppage can be avoided, as well as an advantage that the time required for the whole measurement can be shortened. It should be noted that the angular intervals with respect to the Y axis between points where images are taken by the cameras (measurement points) are not identical to each other, and therefore, it is necessary to perform processing so that an error due to the different angular intervals does not occur in, for example, the data storage process.

Regarding the single-axis independent driving system shown in FIG. 17B, the camera is caused to shake upon stoppage of the Y-axis movement. Therefore, it is necessary to take measures so that there is no influence of the error caused by this shake. Meanwhile, the intervals with respect to the Y axis between points where images are taken can be made identical to each other, and thus the post processing can be simplified.

As shown in FIGS. 17A and 17B, the reciprocal motion is repeated on the X axis. As described above in relation to step S3 of FIG. 16, trigger device 110 outputs the trigger pulse at predetermined angular intervals on the X axis to cameras 11, 12, 13 to cause them to take images.

H. Data Storage Process

Next, details of the data storage process shown in step S7 of FIG. 16 will be described. By way of example, a description will be given of a process procedure followed when the light distribution characteristic measurement apparatus of the light-source-moving type shown in FIG. 12 is used. In the light distribution characteristic measurement apparatus of the light-source-moving type, the goniometer changes the position with respect to the X-axis and/or the Y-axis to thereby cause light source 2 to move. At this time, the position where light source 2 to be measured is imaged, with respect to cameras 11, 12, 13, also changes.

Since cameras 11, 12, 13 take measurements of predetermined surface positions of light source 2 while movements are made with respect to each axis, it is necessary to successively identify (track) the position where light source 2 is to be imaged. Thus, in the present embodiment, a measurement point with respect to light source 2 is determined in advance before the start of measurement. Based on this, data measured while movements are made are processed. For the sake of convenience of processing, the center of each axis is defined as being located at spatial coordinate values (0, 0, 0), and the spatial coordinate values of each measurement point are determined.

Figure 18:
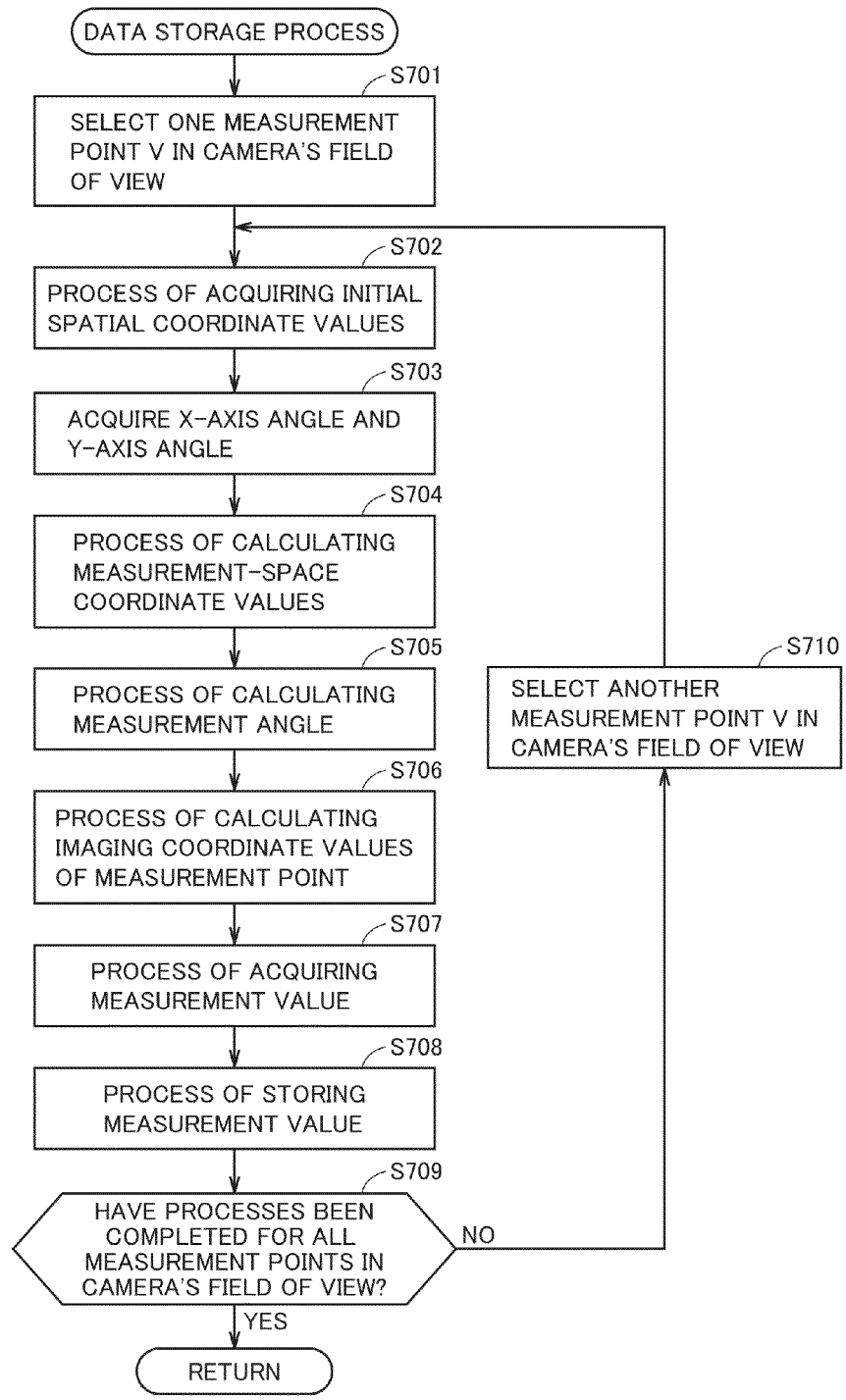
FIG. 18 is a flowchart showing a process procedure for a data storage process shown in step S7 of FIG. 16.

FIG. 18 is a flowchart showing a process procedure for the data storage process shown in step S7 of FIG. 16. Regarding the process procedure shown in FIG. 18, basically process procedures of the number corresponding to the number of cameras installed in association with each other are performed in parallel. For information in an imaging range where respective imaging ranges of a plurality of cameras overlap each other, an adjustment process described later herein is performed.

Referring to FIG. 18, CPU 101 of computer 100 first selects any one measurement point V in a field of view of a camera (step S701). Subsequently, CPU 101 of computer 100 performs a process of acquiring initial spatial coordinate values (step S702). In the process of acquiring the initial spatial coordinate values, one of a plurality of measurement points located in the field of view of the camera is selected as measurement point V, and the spatial coordinate values (initial spatial coordinate values) where this measurement point V is located when cameras 11, 12, 13 are in the initial state (X-axis angle=0°, Y-axis angle=0°) are acquired.

Subsequently, CPU 101 of computer 100 acquires an X-axis angle and a Y-axis angle (step S703) and performs a process of calculating measurement-space coordinate values (step S704). In the process of calculating the measurement-space coordinate values, the coordinate values of measurement point V which moves in accordance with rotation with respect to the X-axis and/or the Y axis are calculated. More specifically, from the initial spatial coordinate values of measurement point V calculated in step S702 as well as the X-axis angle and the Y-axis angle, the spatial coordinate values of measurement point V after being moved are calculated.

Subsequently, CPU 101 of computer 100 performs a process of calculating a measurement angle (step S705). In this process of calculating the measurement angle, an estimate angle of cameras 11, 12, 13 relative to the spatial coordinate values of measurement point V after being moved is calculated, and the estimate angle is added to the movement angle by which each of the X-axis movement and the Y-axis movement has been made, to thereby calculate the measurement angle.

Subsequently, CPU 101 of computer 100 performs a process of calculating imaging coordinate values of the measurement point (step S706). In this process of calculating the imaging coordinate values of the measurement point, the coordinate values of measurement point V in the imaging range of the camera (camera's imaging coordinate values) are calculated. Namely, the positional relationship between the camera's imaging coordinate values and measurement point V corresponds to the relationship between the measurement coordinate values and the camera's imaging coordinate values. The spatial coordinate values of measurement point V can be provided to calculate the camera's imaging coordinate values. Namely, from the camera's imaging position, measurement point V can be identified.

Subsequently, CPU 101 of computer 100 performs a process of acquiring a measurement value (step S707). In this process of acquiring the measurement value, the value (brightness) of identified measurement point V is read from the taken image. When a Y-luminosity filter is attached to cameras 11, 12, 13 each, the contrasting density of the taken image represents the brightness (Y value) thereof.

Subsequently, CPU 101 of computer 100 performs a process of storing the measurement value (step S708). In this process of storing the measurement value, the value of measurement point V acquired in step S707 is stored in association with the measurement angle of measurement point V (calculated in step S705) and the initial spatial coordinate values (calculated in step S702).

Then, CPU 101 of computer 100 determines whether or not the processes have been completed for all measurement points in the field of view of the camera (step S709). When the processes have not been completed for all measurement points in the field of view of the camera (NO in step S709), CPU 101 of computer 100 selects another measurement point V (step S710), and performs the processes from step S702.

In contrast, when the processes have been completed for all measurement points in the field of view of the camera (YES in step S709), the process returns.

In the following, details of the processes of major steps will be described in more detail.

<<h1: Process of Selecting Measurement Point in Camera's Field of View and Process of Acquiring Measurement Value>>

Figure 19:
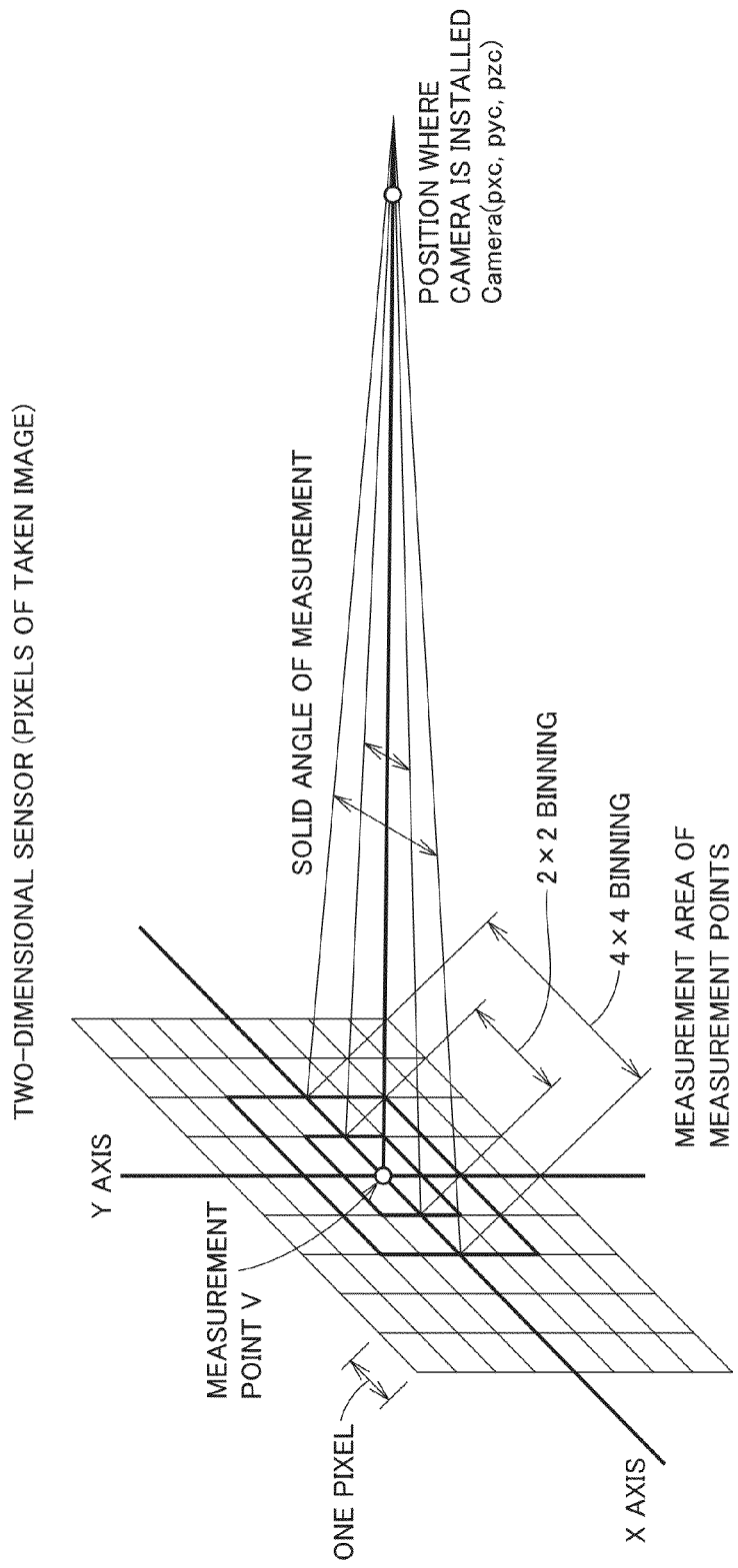
FIG. 19 is a diagram for explaining a process of selecting a measurement point in a camera's field of view and a process of acquiring a measurement value in FIG. 18.

First, a description will be given of the process of selecting a measurement point in the camera's field of view shown in steps S701 and S710 of FIG. 18 as well as the process of acquiring a measurement value shown in step S707 thereof. FIG. 19 is a diagram for explaining the process of selecting a measurement point in the camera's field of view and the process of acquiring the measurement value in FIG. 18.

Referring to FIG. 19, measurement point V is identified as coordinates in an image (pixels of a taken image on a two-dimensional sensor such as CCD) taken by a camera. When the measurement value of measurement point V is to be acquired in step S707, the luminance of one or a plurality of pixels including measurement point V is acquired. Preferably, the average integrated value of the brightness of the taken image in a predetermined area (measurement area of measurement points) which is set relative to measurement point V is used.

Here, the size of the measurement area of measurement points may be set as appropriate. While an increased area where the measurement point is measured improves the S/N (Signal to Noise) ratio, the solid measurement angle increases, which may cause deterioration of the resolving power of the measurement angle. Therefore, depending on the required resolving power or the like, the size of the measurement area of measurement points is designed as appropriate.

<<h2: Process of Calculating Measurement-Space Coordinate Values>>

Figure 20B:
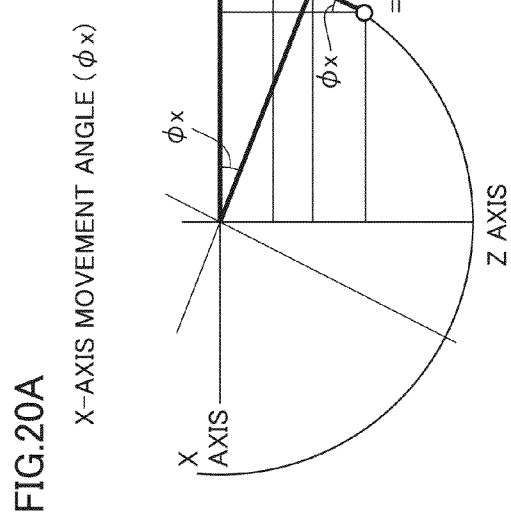
FIGS. 20A and 20B are diagrams for explaining a process of calculating measurement-space coordinate values in FIG. 18.
Figure 20A:
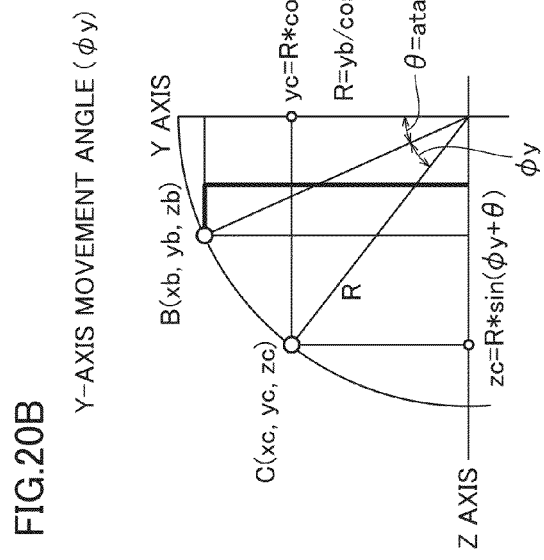

Next, the process of calculating the measurement-space coordinate values shown in step S704 of FIG. 18 will be described. FIGS. 20A and 20B are diagrams for explaining the process of calculating the measurement-space coordinate values in FIG. 18. In connection with FIGS. 20A and 20B, the case will be considered first by way of example in which initial position A is rotated relative to the X axis by a movement angle (X-axis movement angle) $\phi x$ to move to position B after the X-axis movement, and further rotated relative to the Y axis by a movement angle (Y-axis movement angle) $\phi y$ to move to position C after the Y-axis movement.

As shown in FIG. 20A, the coordinate values (xb, yb, zb) of position B after the X-axis movement are calculated in the following manner based on the coordinate values (xa, ya, za) of initial position A and movement angle $\phi x$.

$$xb=xa*\cos \phi x-za*\sin \phi x$$

$$yb=ya$$

$$zb=xa*\sin \phi x-za*\cos \phi x$$

Next, coordinate values (xc, yc, zc) of position C after the Y-axis movement as shown in FIG. 20B will be considered.

The distance R between position B after the X-axis movement and the center coordinates is as follows.

$$R=yb/\cos \theta$$

Angle $\theta$ between position B and the Y axis of the center coordinates is as follows.

$$\theta=a \tan(zb/yb)$$

These values are utilized to calculate, in the following manner, the coordinate values (xc, yc, zc) of position C after the Y-axis movement.

$$xc=xb=xa*\cos \phi x-za*\sin \phi x$$

$$yc=R*\cos(\phi y+\theta)$$

$$zc=R*\sin(\phi y+\theta)$$

For any of the X-axis rotation and/or the Y-axis rotation, they can be calculated successively in a similar manner to the above-described one.

<<h3: Process of Calculating Measurement Angle>>

Figure 21A:
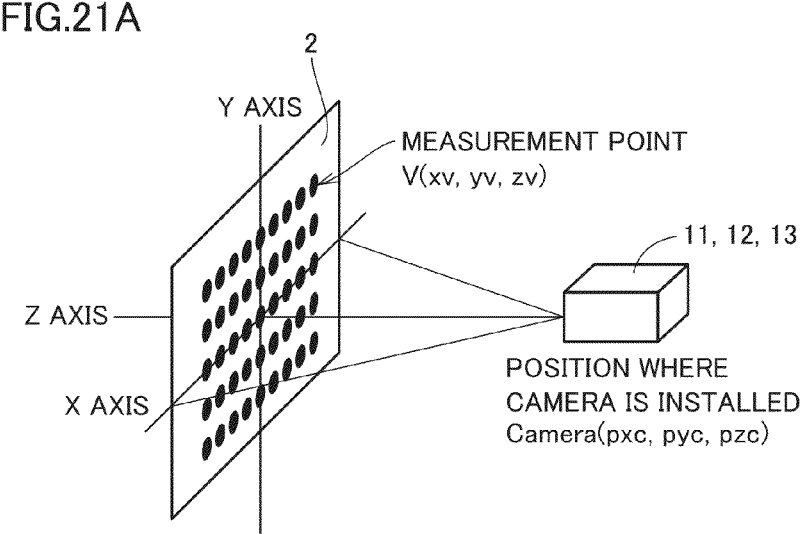
FIGS. 21A and 21B are diagrams for explaining a process of calculating a measurement angle in FIG. 18.
Figure 21B:
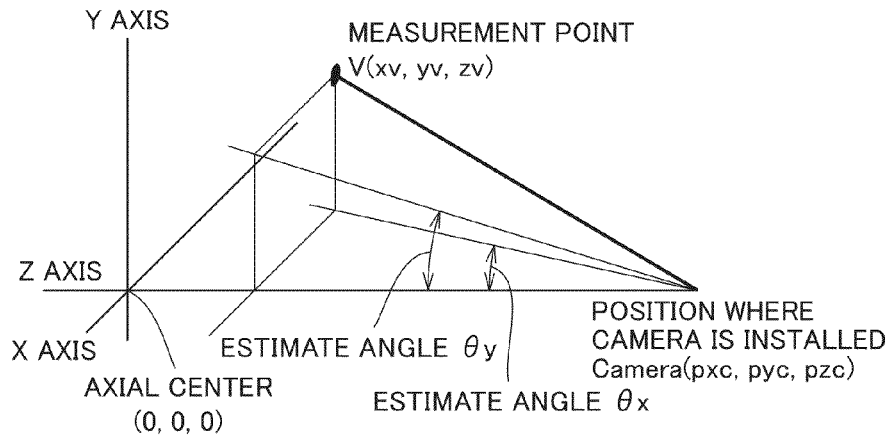
Figure 22:
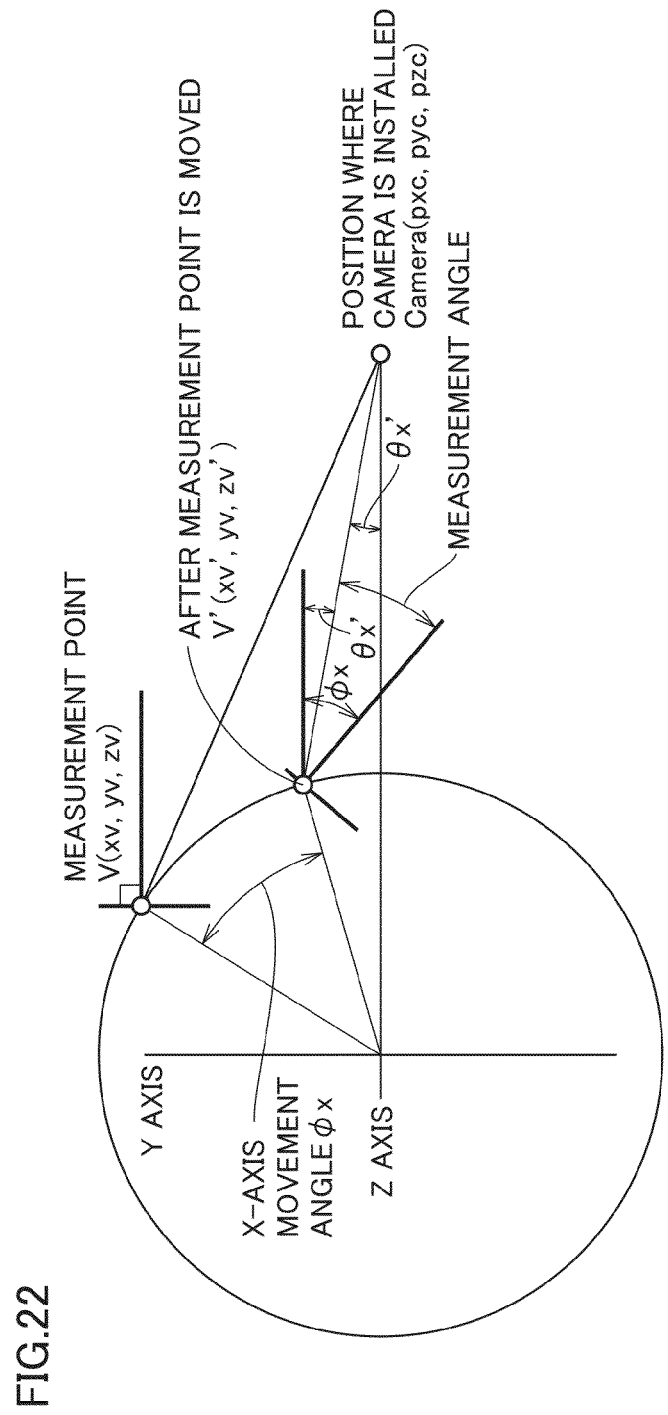
FIG. 22 is a diagram for explaining a process of calculating a measurement angle in FIG. 18.

Next, a description will be given of the process of calculating the measurement angle shown in step S705 of FIG. 18. FIGS. 21A, 21B, and 22 are diagrams for explaining the process of calculating the measurement angle in FIG. 18. More specifically, FIGS. 21A and 21B show a method for calculating an estimate angle, and FIG. 22 shows a method for calculating the measurement angle from the movement angle.

As shown in FIG. 21A, the position where the camera is installed is indicated by Camera (pxc, pyc, pzc), and the coordinate values of any one measurement point V in the camera's field of view is indicated by (xv, yv, zv). This measurement point V corresponds to an emission point on light source 2. As shown in FIG. 21B, where the center of each axis is indicated by spatial coordinate values (0, 0, 0), estimate angles θx, θy of measurement point V are as follows.

$$\theta x = a \tan \{(xv-pxc)/(zv-pzc)\}$$

$$\theta y = a \tan \{(yv-pyc)/(zv-pzc)\}$$

Next, following the procedure as shown in FIG. 22, the measurement angle is calculated from the movement angle of measurement point V. For example, it is supposed that measurement point V has rotated along the X axis by a movement angle (X-axis movement angle) φx. It is also supposed that the rotation along the X axis causes measurement point V in the initial state to move to measurement point V' (xv', yv, zv'). The spatial coordinates of measurement point V' after this movement are calculated from the relationship between the amount of rotational movement and the measurement coordinates. Estimate angle θx' of measurement point V' is calculated in accordance with the following formula.

$$\theta x' = a \tan \{(xv'-pxc)/(zv'-pzc)\}$$

Then, the measurement angle for measurement point V' is calculated as movement angle φx−estimate angle θx'.

<<h4: Process of Calculating Imaging Coordinate Values of Measurement Point>>

Figure 23:
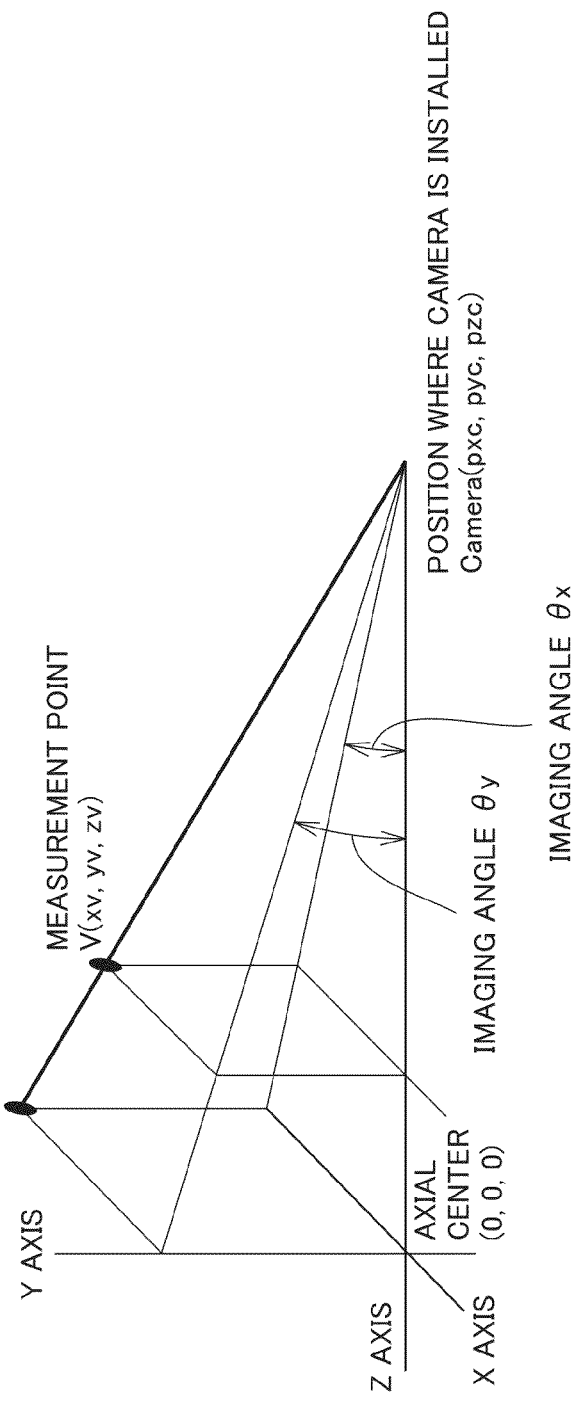
FIG. 23 is a diagram for explaining a process of calculating imaging coordinate values of a measurement point in FIG. 18.

Next, the process of calculating the imaging coordinate values of the measurement point shown in step S706 of FIG. 18 will be described. FIG. 23 is a diagram for explaining the process of calculating the imaging coordinate values of the measurement point in FIG. 18.

Referring to FIG. 23, the imaging coordinate space is set so that its center is located at the axial center. The X coordinate plane and the Y coordinate plane are each a plane perpendicular to the corresponding rotational axis.

Imaging angles θx and θy of the camera relative to measurement point V are calculated in accordance with the following formulas.

$$\theta x = a \tan((pzc-zv)/xv)$$

$$\theta y = a \tan((pzc-zv)/yv)$$

The imaging plane (imaging spatial coordinates) of the camera is supposed to be the X-Y plane where the z coordinate is 0. At this time, imaging coordinate values C (xc, yc, zc) on the imaging plane are calculated from imaging angles θx and θy in accordance with the following formulas.

$$xc = pzc * \tan \theta x$$

$$yc = pzc * \tan \theta y$$

$$zc = 0$$

The coordinates relative to the coordinates on the two-dimensional sensor (CCD) of the camera are calculated in accordance with the following formulas.

$$px = xc * (ccd\_x\_num/width)$$

$$py = yc * (ccd\_y\_num/height)$$

It should be noted that ccd_x_num and ccd_y_num represent the number of lateral pixels and the number of vertical pixels of the CCD and "width" and "height" represent the lateral width and the vertical width respectively of the imaging range.

<<h5: Process of Acquiring and Process of Storing Measurement Value>>

Figure 24A:
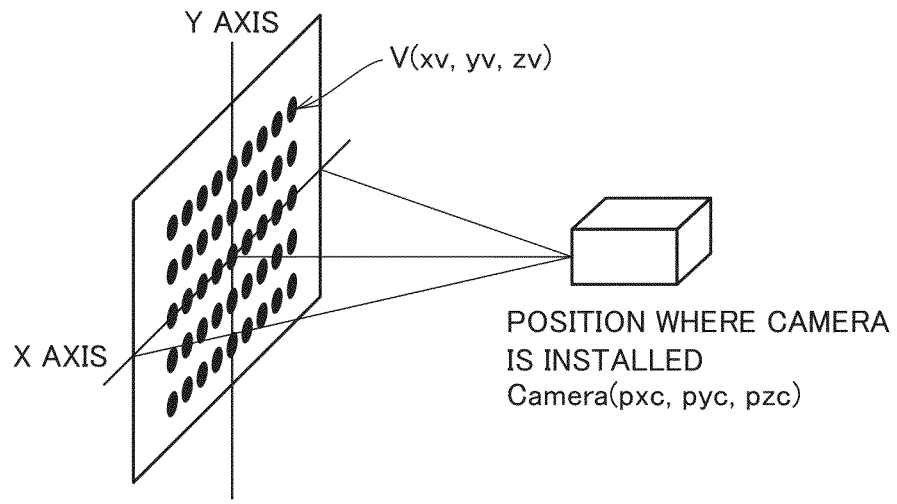
FIGS. 24A, 24B, and 25 are diagrams for explaining a process of acquiring and a process of storing a measurement value in FIG. 18.
Figure 24B:
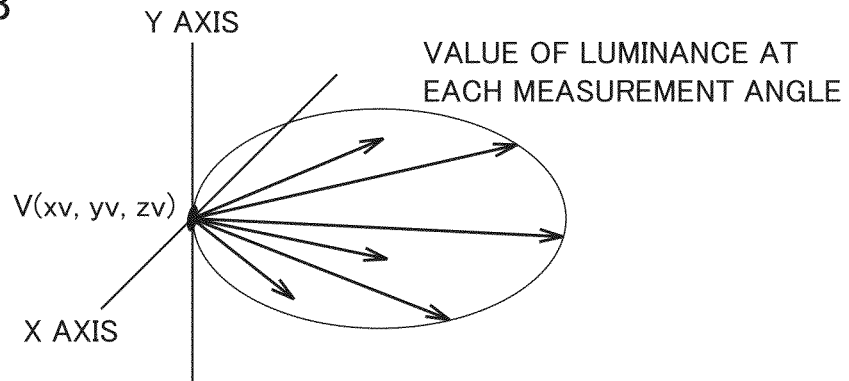
Figure 25:
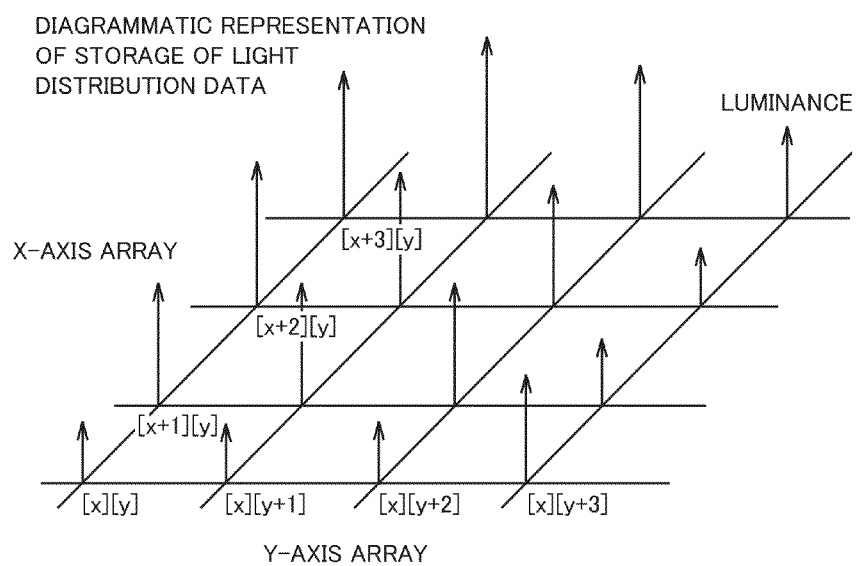

Next, the process of acquiring the measurement value shown in step S707 of FIG. 18 and the process of storing the measurement value shown in step S708 thereof will be described. FIGS. 24A, 24B, and 25 are diagrams for explaining the process of acquiring and the process of storing a measurement value in FIG. 18.

As shown in FIG. 24A, the luminance for each measurement angle is acquired for each measurement point. This process of acquiring the luminance has been described above with reference to FIG. 19. A collection of luminance values at respective measurement angles is the luminance distribution data. As shown in FIG. 24B, the luminance at each measurement angle is acquired for each measurement point. Namely, for each of a plurality of measurement angles corresponding to the respective measurement points, the luminance is acquired. Thus, in the present embodiment, the light distribution characteristic is calculated at each of a plurality of measurement points included in the detection range (imaging range) of the detector (camera).

For example, the array structure as shown in FIG. 25 is utilized to store each luminance associated with the measurement angle. Each luminance stored in this array structure is an element of the luminance distribution data. Namely, for each measurement point, the luminance at a measurement angle (X-axis component and Y-axis component) is stored in the two-dimensional array. When the light source has a light distribution characteristic, the magnitude of the luminance varies depending on the measurement angle as shown in FIG. 25.

As a matter of course, an arbitrary data storage method may be employed instead of the array structure as shown in FIG. 25.

I. Illuminance Calculation Process

Next, details of the illuminance calculation process shown in step S10 of FIG. 16 will be described. In this illuminance calculation process, the light beam (luminance) from the light source that is incident on an illuminance-calculated position where the illuminance at this position is to be calculated is integrated in consideration of the light distribution characteristic of the light source to thereby calculate the illuminance at this position. Therefore, the measurement point(s) is identified that is a point from which emitted the light that can be incident on the illuminance-calculated position and the process of integrating the luminance at this measurement point is performed on which the estimate angle of each measurement point is reflected.

Figure 26:
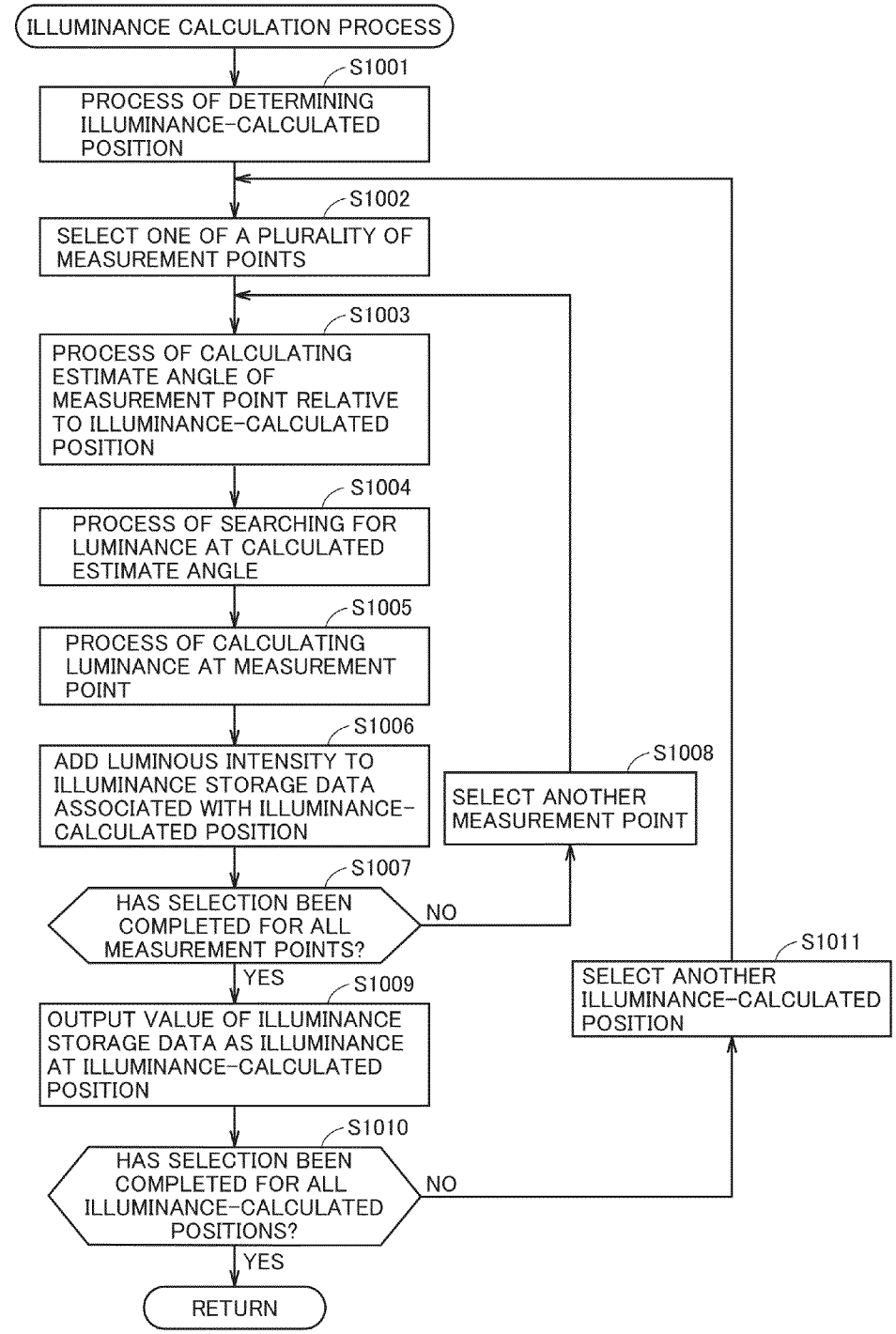
FIG. 26 is a flowchart showing a process procedure for an illuminance calculation process shown in step S10 of FIG. 16.

FIG. 26 is a flowchart showing a process procedure for the illuminance calculation step shown in step S10 of FIG. 16. Each step shown in FIG. 26 is mainly performed by CPU 101 of computer 100.

Referring to FIG. 26, CPU 101 of computer 100 performs the process of determining the illuminance-calculated position (step S1001). In this process of determining the illuminance-calculated position, CPU 101 sets any region (typically a wall surface) where the illuminance of this region should be calculated, determines one point which is included in this set region and which is to be the illuminance-calculated position, and acquires the spatial coordinates of this position.

Subsequently, CPU 101 of computer 100 selects any one measurement point from a plurality of measurement points for which the luminance distribution data has been acquired (step S1002). Subsequently, CPU 101 of computer 100 calculates an estimate angle of the selected measurement point relative to the illuminance-calculated position (step S1003). Details of the process of calculating the estimate angle will be described later herein.

Subsequently, CPU 101 of computer 100 searches the luminance distribution data associated with the selected measurement point, for the luminance at the estimate angle calculated in step S1003 (step S1004). Namely, the luminance corresponding to the calculated estimate angle is searched for.

Subsequently, CPU 101 of computer 100 acquires the storage address where the luminance distribution data is stored in the vicinity of the calculated estimate angle, and approximates the luminance included in the range of the searched light distribution data, to thereby calculate the luminance of the selected measurement point (step S1005). Then, CPU 101 of computer 100 uses the luminous intensity correction factor to convert the calculated luminance to the luminous intensity, and adds the calculated luminous intensity to the illuminance storage data associated with the selected illuminance-calculated position (step S1006).

Then, CPU 101 of computer 100 determines whether or not the selection has been completed for all of a plurality of measurement points for which the luminance distribution data has been acquired (step S1007). When any of a plurality of measurement points has not been selected (NO in step S1007), CPU 101 selects another measurement point (step S1008), and performs the processes from step S1003.

In contrast, when selection has been completed for all of a plurality of measurement points (YES in step S1007), CPU 101 outputs the value of the illuminance storage data associated with the selected illuminance-calculated position, as the illuminance at this illuminance-calculated position (step S1009).

Namely, the process of adding the luminance (or the luminous intensity obtained by conversion) for all measurement points is executed for one illuminance-calculated position. When the process of adding it to the illuminance storage data is completed for all of the measurement points, the result of addition is the illuminance at the corresponding illuminance-calculated position.

The above series of processes is also performed for other illuminance-calculated positions. Namely, from the region where the illuminance should be calculated, illuminance-calculated positions are successively identified and the above-described processes are repeatedly performed. More specifically, CPU 101 of computer 100 determines whether or not the selection has been completed for all of a plurality of illuminance-calculated positions that are included in the region which has been set as a region where the illuminance should be calculated (step S1010). When any of a plurality of illuminance-calculated positions has not been selected (NO in step S1010), CPU 101 selects another illuminance-calculated position (step S1011), and performs the processes from step S1002.

In contrast, when all of a plurality of illuminance-calculated positions have been selected (YES in step S1010), the process returns.

<<i1: Process of Determining Illuminance-Calculated Position>>

Figure 27A:
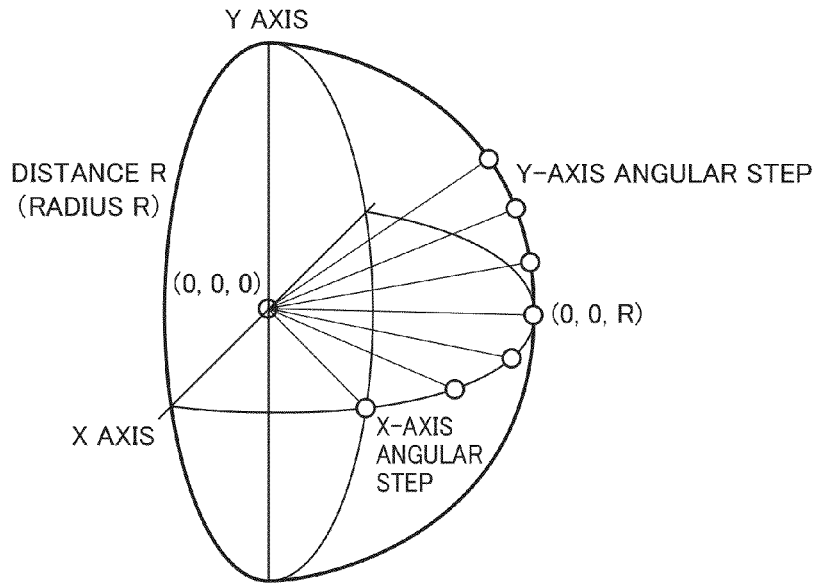
FIGS. 27A and 27B are diagrams for explaining a process of determining an illuminance-calculated position in FIG. 26.
Figure 27B:
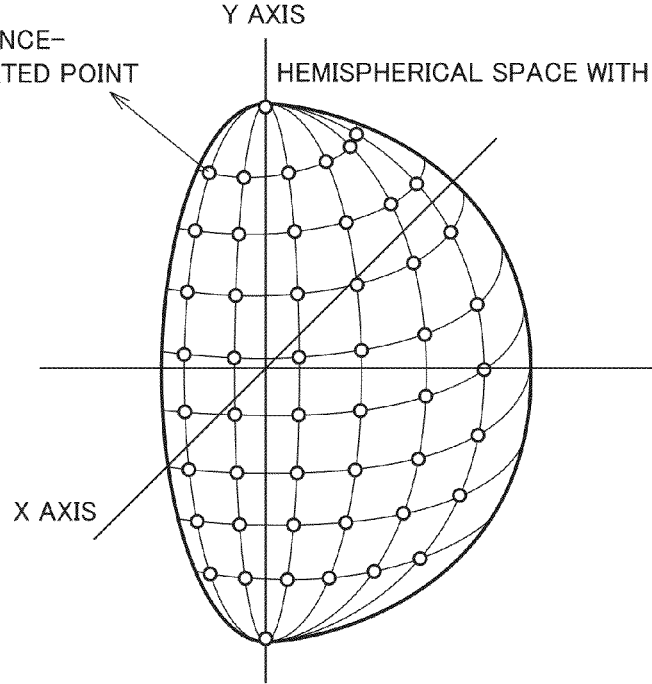

First, the process of determining the illuminance-calculated position shown in step S1001 of FIG. 26 will be described. FIGS. 27A and 27B are diagrams for explaining the process of determining the illuminance-calculated position in FIG. 26.

Referring to FIGS. 27A and 27B, generally the illuminance-calculated position is given by the X-Y coordinate system, the $\alpha$-$\beta$ coordinate system, or the $\phi$-$\theta$ coordinate system. FIG. 27A shows an example where a region where the illuminance is to be calculated is defined by the X-Y coordinate system. The illuminance-calculated positions are set on this region. Typically, positions that are set at regular intervals by any of the coordinate systems are the illuminance-calculated positions. In the example shown in FIG. 27A, the illuminance-calculated positions are set at the intervals of X-axis steps and Y-axis steps. An example where the illuminance-calculated positions are set for the entire space is shown in FIG. 27B.

For the sake of convenience of calculation, the axial center is defined as the origin (0, 0, 0) of the spatial coordinate system, and spatial coordinate values representing the set illuminance-calculated position are determined.

<<i2: Process of Calculating Estimate Angle of Measurement Point Relative to Illuminance-Calculated Position>>

Figure 28:
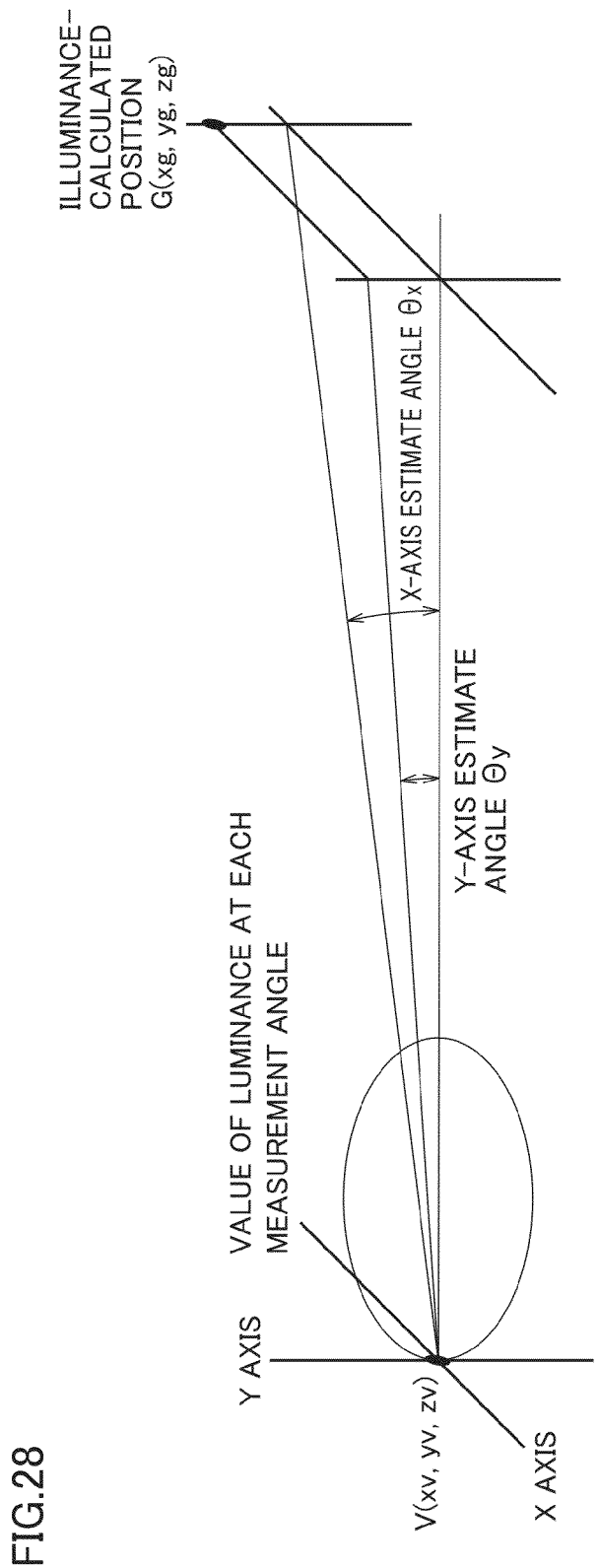
FIG. 28 is a diagram for explaining a process of calculating an estimate angle of a measurement point relative to the illuminance-calculated position in FIG. 26.

Next, a description will be given of the process of calculating the estimate angle of the measurement point relative to the illuminance-calculated position shown in step S1003 of FIG. 26. FIG. 28 is a diagram for explaining the process of calculating the estimate angle of the measurement point relative to the illuminance-calculated position in FIG. 26.

As shown in FIG. 28, it is supposed here that any one measurement point V has coordinate values (xv, yv, zv) and an illuminance-calculated position G has coordinate values (xg, yg, zg). At this time, estimate angles $\Theta x$, $\Theta y$ of measurement point V relative to illuminance-calculated position G are as follows.

$$\Theta x = a \tan\{(xg-xv)/(zg-zv)\}$$

$$\Theta y = a \tan\{(yg-yv)/(zg-zv)\}$$

<<i3: Process of Searching for Luminance at Estimate Angle>>

Figure 29:
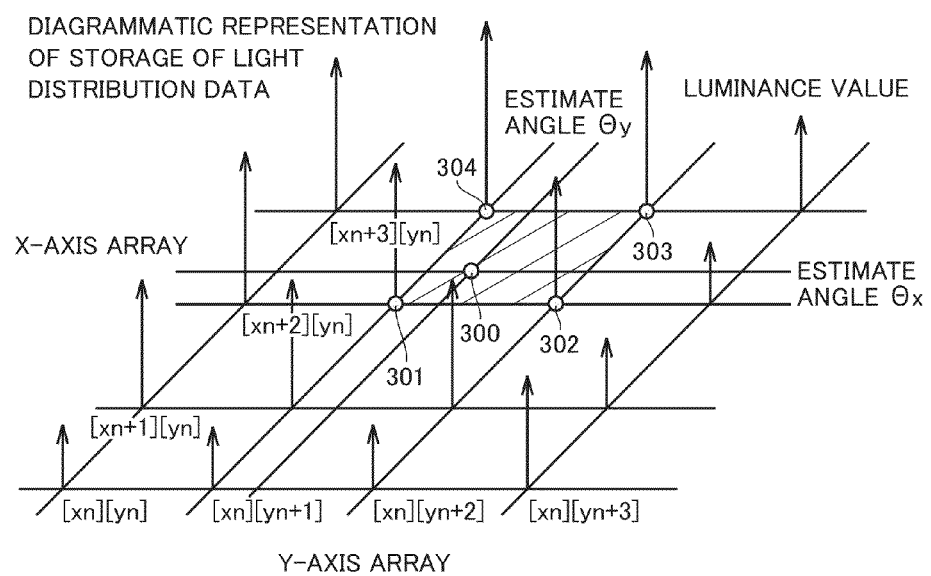
FIG. 29 is a diagram for explaining a process of searching for the luminance at the estimate angle in FIG. 26.

Next, a description will be given of the process of searching for the luminance at the estimate angle shown in step S1004 of FIG. 26. FIG. 29 is a diagram for explaining the process of searching for the luminance at the estimate angle in FIG. 26.

The above-described array structure as shown in FIG. 25 is utilized to store each luminance associated with the measurement angle. Such an array structure is utilized to search for the storage addresses (estimate angles $\theta x$, $\theta y$) in the light distribution data that are located around the intersection of estimate angles $\Theta x$ and $\Theta y$ that correspond to the measurement point relative to the illuminance-calculated position.

In the example shown in FIG. 29, four storage addresses (array positions 301, 302, 303, 304) adjacent to the intersection 300 of estimate angle $\Theta x$ and estimate angle $\Theta y$ on the two-dimensional array are searched for. Namely, it can be determined that the value of the illuminance in the range enclosed by these four addresses searched for is generated at the corresponding illuminance-calculated position.

<<i4: Process of Calculating Luminance at Measurement Point>>

Figure 30A:
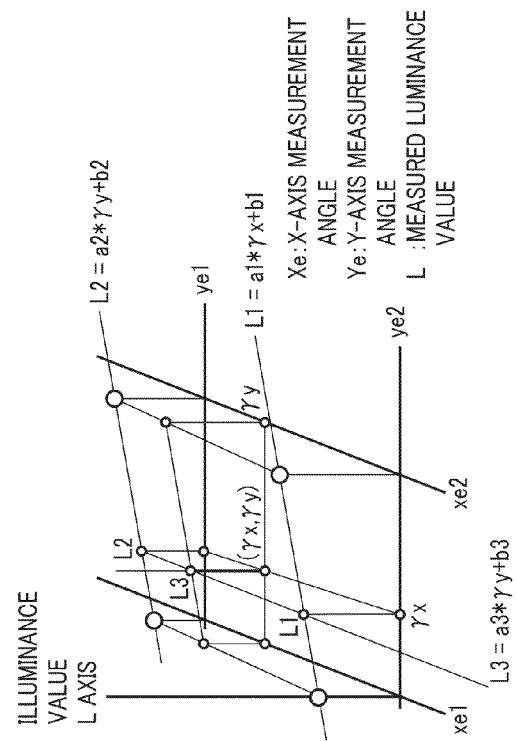
FIGS. 30A and 30B are diagrams for explaining a process of calculating the luminance at a measurement point in FIG. 26.
Figure 30B:
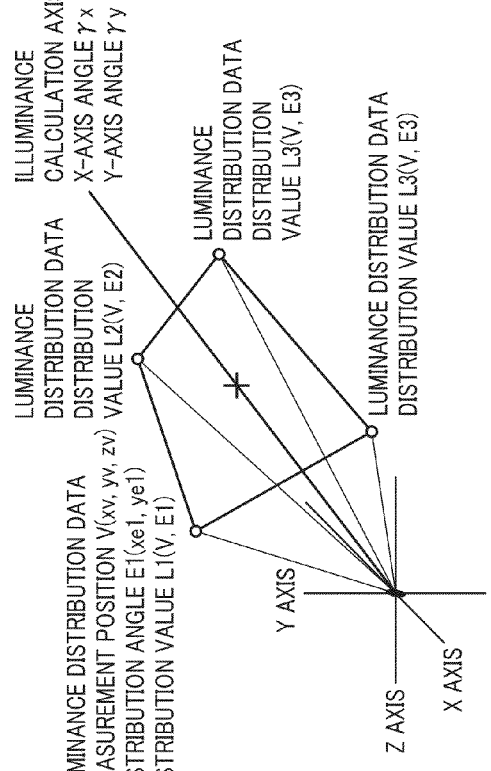

Next, a description will be given of the process of calculating the luminance at the measurement point shown in step S1005 of FIG. 26. FIGS. 30A and 30B are diagrams for explaining the process of calculating the luminance at the measurement point in FIG. 26.

As described above by means of above-referenced FIG. 29, based on the data stored at the storage addresses in the vicinity of the intersection of estimate angles $\Theta x$ and $\Theta y$ that correspond to the measurement point relative to the illuminance-calculated position, the luminance is calculated. For example, referring to FIG. 30A, for a luminance plane that is defined by the luminance corresponding to the light distribution angles (xe1, ye1), (xe2, ye1), (xe2, ye2), (xe1, ye2), the luminance corresponding to the illuminance calculation axis on the luminance plane is calculated. The illuminance calculation axis is defined as corresponding to estimate angles Θx, Θy of the measurement point relative to the illuminance-calculated position, and is defined by means of X-axis angle γx and Y-axis angle γy.

More specifically, as shown in FIG. 30B, linear interpolation is utilized to calculate the luminance at the illuminance-calculated position, from the adjacent luminance distribution data. In the example of FIG. 30B, a line passing through two points, namely measured luminance L (xe1, ye2) and (xe2, ye2) is defined as approximate line L1 (γx, ye2). Likewise, a line passing through two points, namely measured luminance L (xe1, ye1) and (xe2, ye1) is defined as approximate line L2 (γx, ye1). Further, from the line between approximate lines L1 and L2, an approximate line L3 (γx, γy) is determined. Then, the luminance corresponding to the estimate angle (γx, γy) from the illuminance-calculated point is calculated.

<<i5: Process of Adding Luminous Intensity to Illuminance Storage Data>>

Next, a description will be given of the process of adding the luminous intensity to the illuminance storage data shown in step S1006 of FIG. 26. FIG. 31 is a diagram for explaining the process of adding the luminous intensity to the illuminance storage data in FIG. 26. The illuminance at a certain illuminance-calculated position can be calculated as the integration of the intensity (luminous intensity) of light incident on the illuminance-calculated position.

First, CPU 101 uses luminous intensity correction factor k to convert luminance L at each measurement point that has been calculated to luminous intensity I. Here, illuminance E is proportional to luminous intensity I and inversely proportional to the square of distance d from the light source. Thus, illuminance E from each measurement point is calculated in accordance with the following formula.

Illuminance $E(lx)$=luminous intensity $I(cd)$/distance $d$ (mm)$^2$

It should be noted that distance d is calculated successively in accordance with illuminance-calculated position G (xg, yg, zg) and the coordinate values of each measurement point.

Then, the illuminance at the illuminance-calculated position is the integration of illuminance E from respective measurement points. In this way, the illuminance at illuminance-calculated position G is calculated.

J. Process of Adjusting for Multiple Cameras

In the present embodiment, a plurality of detectors arranged so that they have a predetermined relative relationship with each other are used to measure a light source. The above-described measurement process can be performed independently for each of the detectors. In this case, for the results of evaluation of the same region of the light source, an adjustment process is performed so that the results obtained respectively by the detectors do not interfere with each other.

In contrast, in the case where a plurality of detectors are used respectively for acquiring a plurality of information items (such as chromaticity and wavelength information) from a light source, no interference occurs between the detectors. Therefore, the relative positional relationship between the detectors is utilized to efficiently perform the process of acquiring the information.

<<j1: Light Source with Large Emission Surface/Light Source Having Multiple Emission Points>>

As described above, when the light distribution characteristic of a light source with a large emission surface and/or a light source having a plurality of light emission points is to be measured, a plurality of cameras 11, 12 arranged parallel to each other as shown in above-referenced FIG. 4A are used. In this case, respective imaging ranges of cameras 11, 12 overlap each other, and it is necessary to appropriately adjust the result of measurement of the overlapped range. More specifically, as to the overlapped range, only the result obtained from one of the detectors is made effective, among respective results obtained from a plurality of corresponding detectors (cameras).

Figure 32:
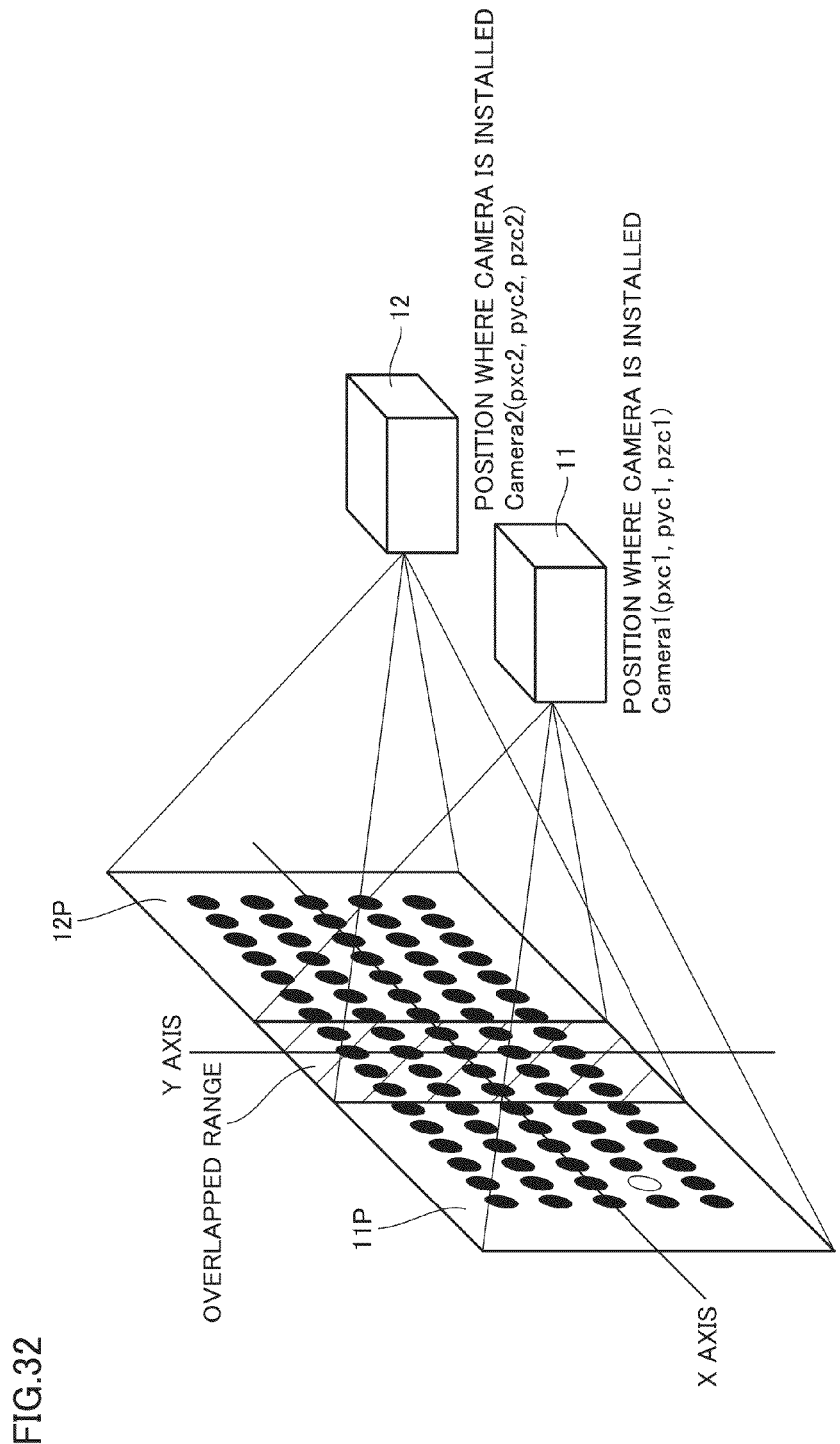
FIG. 32 is a schematic diagram showing a configuration where a plurality of cameras are arranged parallel to each other in the light distribution characteristic measurement apparatus of the present embodiment.

FIG. 32 is a schematic diagram showing a configuration where a plurality of cameras are arranged parallel to each other in the light distribution characteristic measurement apparatus of the present embodiment. Referring to FIG. 32, when a light source is to be imaged by means of a plurality of cameras so that the field of view (imaging range) is enlarged, the cameras are each installed so that the direction of the optical axis of each camera is perpendicular to the X-Y plane. In addition, the cameras are installed parallel to each other.

The relationship between imaging coordinate values on respective imaging planes 11P, 12P of the cameras and each measurement point can be calculated by using the position where each camera is installed (coordinate values in the space where the camera is installed) and the spatial coordinate values of the measurement point in the manner described above with reference to FIG. 23.

For example, regarding the measurement points included in the overlapped range shown in FIG. 32, the measurement points can be evaluated based on any of respective results of detection by cameras 11 and 12. Therefore, when a plurality of cameras are used to measure the same measurement point, a process of making ineffective the result of measurement by one of the cameras or a process of averaging respective results of measurement of the same measurement point is performed. Accordingly, it is possible to avoid the state where the same measurement point is measured by a plurality of cameras to thereby cause the result of measurement to deviate from the actual value.

<<j2: Measurement of Multiple Data Items (Such as Chromaticity and Wavelength Information)>>

As described above, when a plurality of information items (such as chromaticity and wavelength information) about a light source are to be measured, a plurality of cameras adapted respectively to the information items to be measured are installed next to each other so that respective distances from the light source to the cameras are equal to each other. Each camera measures one information item assigned to the camera among a plurality of information items. Therefore, an optical filter appropriate for the information item to be measured is mounted at a stage preceding each camera.

Figure 33:
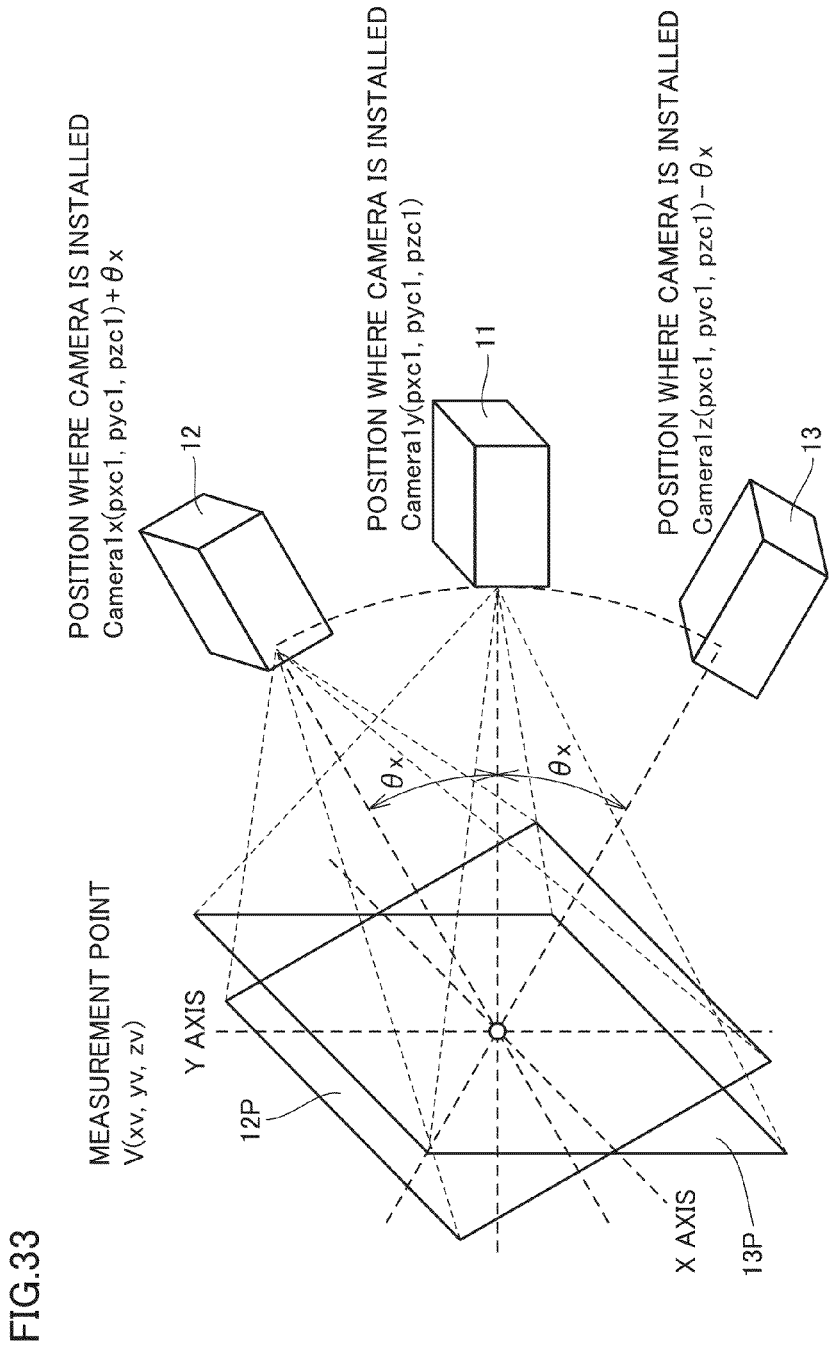
FIG. 33 is a schematic diagram showing a configuration where a plurality of cameras are arranged so that they are displaced from each other by a predetermined angle in the light distribution characteristic measurement apparatus of the present embodiment.

FIG. 33 is a schematic diagram showing a configuration where a plurality of cameras are arranged so that they are displaced from each other by a predetermined angle in the light distribution characteristic measurement apparatus of the present embodiment. Referring to FIG. 33, cameras 11, 12, 13 have respective abilities equivalent to each other. Cameras 12 and 13 are each installed at the position displaced from camera 11 by angle θ with respect to the center of the X axis or Y axis. Namely, when cameras 11, 12, 13 are rotated together by the same angle θ as angle θ by which the cameras are displaced from each other, the coordinates where camera 12 or camera 13 having been rotated is installed are identical to the coordinates where camera 11 before being rotated is installed.

In other words, when these cameras 11, 12, 13 are used to take images at the same time, the image taken by camera 11 at its installation position (movement angle) and the images (image planes 12P, 13P) taken at respective positions which are displaced (added and subtracted) by angle θ relative to the movement angle of camera 11 are acquired. Therefore, a first detection result (taken image) acquired at a certain timing by a first detector (camera 11) is stored in association with the positional information (movement angle) about the first detector, and a second detection result acquired at this timing by a second detector (cameras 12, 13) is stored in association with the positional information (movement angle+angle θ) which is obtained by correcting the positional information about the first detector based on the relative relationship (angle θ) between the first detector and the second detector.

Namely, when camera 11 is at the original position (movement angle=0°), the image taken by camera 12 corresponds to an image taken by the camera at the movement angle=θ and the image taken by camera 13 corresponds to an image taken by the camera at the movement angle=-θ. Therefore, when these data items are to be stored as light distribution data, the light distribution data items acquired by camera 12 and camera 13 are stored in association with respective movement angles determined by adding/subtracting angle θ to/from the movement angle of camera 11 at which the light distribution data is acquired at the same time.

When a plurality of information items (such as chromaticity and wavelength information) about the light source are to be measured, respective results of measurement by cameras 11, 12, 13 do not interfere with each other. Therefore, no adjustment is necessary for respective results of measurement. While these cameras are moved in a predetermined measurement range, measurements are taken so that necessary information can be acquired in the end. Namely, when cameras 11, 12, 13 are rotated by 360°, the movement angle of camera 11 changes from 0° to 360° and the light distribution data are stored in association with these movement angles. In contrast, the movement angle of camera 12 changes from θ to (θ+360°) and the light distribution data are stored in association with these movement angles. Likewise, the movement angle of camera 13 changes from -θ to (-θ+360°) and the light distribution data are stored in association with these movement angles. In other words, the results of measurement that are calculated from images taken respectively by the cameras at a certain timing are stored in association with respective movement angles of the cameras, respectively. The measurement operation can repeatedly be performed in the measurement range to finally acquire a plurality of information items in a required measurement range.

<<j3: Multiple Camera Groups>>

As described above with reference to FIG. 8, a plurality of cameras (a group of cameras) may be installed and a similar group of cameras may further be installed for measuring a plurality of data items (such as chromaticity and wavelength information). Namely, as shown in FIG. 8, cameras 11#, 12#, 13# are arranged in addition to cameras 11, 12, 13 so that they take images of light source 2.

For example, when the chromaticity is to be measured, chromaticity filters are mounted respectively for cameras 11, 12, 13 (Cameras 1x, 1y, 1z) and similar chromaticity filters are also mounted for cameras 11#, 12#, 13# (Cameras 2x, 2y, 2z). Cameras 11, 12, 13 and cameras 11#, 12#, 13# are arranged parallel to each other.

FIG. 34 is a diagram for explaining a process of adding the luminous intensity when a plurality of camera groups are used. Referring to FIG. 34, it is supposed that cameras 11, 12, 13 (Cameras 1x, 1y, 1z) have acquired distribution characteristic of three parameters (Chromaticity X, Y, Z) for measurement points V1 and V2, and cameras 11#, 12#, 13# (Cameras 2x, 2y, 2z) have acquired distribution characteristic of three parameters (Chromaticity X, Y, Z) for measurement points V3 and V4. These acquired parameters are to be stored in association with the cameras, respectively.

Therefore, if respective imaging ranges of the cameras do not overlap each other, the cameras adjacent to each other may share the results of measurement for measurement points V1 to V4 and the luminance (chromaticity) emitted from each measurement point may be added in a similar manner to the one described above with reference to FIG. 31, to thereby calculate the chromaticity at an arbitrary position where the chromaticity is to be calculated.

In the case where respective imaging ranges of cameras adjacent to each other overlap each other, overlapping of measurement points is cancelled in a similar way to the one described in section <<j1>> above, and then the addition process is performed.

K. Advantages

The light distribution characteristic measurement apparatus of the present embodiment is capable of imaging a light source by means of a plurality of detectors (cameras) and therefore capable of measuring the light distribution characteristic of the light source with adequate spatial resolving power kept, regardless of the size of the light source. Moreover, the apparatus is capable of measuring the light distribution characteristic of a light source even if the light source has a plurality of light emission points located away from each other, with adequate spatial resolving power kept. Furthermore, since a plurality of detectors are used to take images (measurements) at the same time, the time for the whole measurement can be shortened.

From the above description, other advantages of the light distribution characteristic measurement apparatus of the present embodiment will be clarified.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A light distribution characteristic measurement apparatus for measuring a light distribution characteristic of a light source, comprising:
   a plurality of detectors arranged so that said detectors have a predetermined relative relationship with each other, one detector having a detection range at least partially overlapping a detection range of another detector adjacent to said one detector;
   a drive unit configured to drive said plurality of detectors as one unit to update a positional relationship of said plurality of detectors relative to said light source; and
   a calculation unit configured to calculate the light distribution characteristic of said light source by performing a process depending on at least one of the relative relationship between said plurality of detectors and overlapping of respective detection ranges of said plurality of detectors, based on respective results of detection that have been acquired by said plurality of detectors at the same timing.

2. The light distribution characteristic measurement apparatus according to claim 1, wherein said plurality of detectors are arranged so that respective optical axis directions are parallel to each other and each detector has a detection range partially overlapping a detection range of another detector.

3. The light distribution characteristic measurement apparatus according to claim 2, wherein among respective results of calculation made from results of detection by relevant multiple detectors with regard to one of the overlapping detection ranges, only one result of calculation is made effective.

4. The light distribution characteristic measurement apparatus according to claim 1, wherein said plurality of detectors are arranged so that respective optical axis directions are directed to a predetermined reference point and respective detection ranges are substantially identical to each other.

5. The light distribution characteristic measurement apparatus according to claim 4, wherein said calculation unit is further configured to store a first detection result acquired by a first detector at a certain timing, in association with positional information about said first detector, and store a second detection result acquired by a second detector at said timing, in association with positional information that is obtained by correcting said positional information about said first detector based on the relative relationship between said first detector and said second detector.

6. The light distribution characteristic measurement apparatus according to claim 1, wherein said calculation unit is further configured to calculate the light distribution characteristic at each of a plurality of measurement points included in a detection range of a detector.

7. The light distribution characteristic measurement apparatus according to claim 1, wherein said drive unit is configured to change the positional relationship between said light source and said plurality of detectors in two different axial directions independently of each other.

8. A light distribution characteristic measurement method for measuring a light distribution characteristic of a light source, comprising:
arranging a plurality of detectors so that said detectors have a predetermined relative relationship with each other and one detector has a detection range at least partially overlapping a detection range of another detector adjacent to said one detector;
updating a positional relationship of said plurality of detectors relative to said light source by driving said plurality of detectors as one unit; and
calculating the light distribution characteristic of said light source by performing a process depending on at least one of the relative relationship between said plurality of detectors and overlapping of respective detection ranges of said plurality of detectors, based on respective results of detection that have been acquired by said plurality of detectors at the same timing.

9. The light distribution characteristic measurement method according to claim 8, wherein the step of arranging includes arranging said plurality of detectors so that respective optical axis directions are parallel to each other and each detector has a detection range partially overlapping a detection range of another detector.

10. The light distribution characteristic measurement method according to claim 9, wherein the step of calculating includes making effective only one among respective results of calculation made from results of detection by relevant multiple detectors with regard to one of the overlapping detection ranges.

11. The light distribution characteristic measurement method according to claim 8, wherein the step of arranging includes arranging said plurality of detectors so that respective optical axis directions are directed to a predetermined reference point and respective detection ranges are substantially identical to each other.

12. The light distribution characteristic measurement method according to claim 11, wherein the step of calculating includes storing a first detection result acquired by a first detector at a certain timing, in association with positional information about said first detector, and storing a second detection result acquired by a second detector at said timing, in association with positional information that is obtained by correcting said positional information about said first detector based on the relative relationship between said first detector and said second detector.

13. The light distribution characteristic measurement method according to claim 8, wherein the step of calculating includes calculating the light distribution characteristic at each of a plurality of measurement points included in a detection range of a detector.

14. The light distribution characteristic measurement method according to claim 8, wherein the step of updating includes changing the positional relationship between said light source and said plurality of detectors in two different axial directions independently of each other.

* * * * *